US012812753B1

(12) United States Patent
Zhong et al.

(10) Patent No.: US 12,812,753 B1
(45) Date of Patent: Nov. 24, 2026

(54) PROJECTION LAMP

(71) Applicant: SHENZHEN ANDELIAN TECHNOLOGY CO., LTD., Shenzhen (CN)

(72) Inventors: Shaohua Zhong, Shenzhen (CN); Shaoqi Ji, Zhongshan (CN)

(73) Assignee: SHENZHEN ANDELIAN TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 19/636,043

(22) Filed: Apr. 1, 2026

Related U.S. Application Data

(63) Continuation-in-part of application No. 19/214,104, filed on May 21, 2025.

(30) Foreign Application Priority Data

Feb. 11, 2026 (CN) ......................... 202610205424.4
Mar. 4, 2026 (CN) ......................... 202620264592.6

(51) Int. Cl.
*H05B 47/105* (2020.01)
*F21V 14/00* (2018.01)
(Continued)

(52) U.S. Cl.
CPC ......... *H05B 47/105* (2020.01); *F21V 14/006* (2013.01); *F21V 33/0056* (2013.01); *H04R 1/028* (2013.01); *H04R 3/005* (2013.01); *H05B 45/10* (2020.01); *H05B 47/16* (2020.01); *H05B 47/19* (2020.01)

(58) Field of Classification Search
CPC ...... H05B 47/105; H05B 45/10; H05B 47/16; H05B 47/19; F21V 14/006; F21V 33/0056; H04R 1/028; H04R 3/005
See application file for complete search history.

(56) References Cited

U.S. PATENT DOCUMENTS

2008/0184870 A1* 8/2008 Toivola .................. G10H 1/365 84/610
2013/0070093 A1* 3/2013 Rivera ................. G06Q 20/384 348/143
(Continued)

*Primary Examiner* — Kevin Quarterman
(74) *Attorney, Agent, or Firm* — HOWARD M COHN and Associates, LLC

(57) ABSTRACT

A projection lamp includes a projection mechanism, a wireless communication module, a speaker module; and a control module. The projection mechanism includes a light source, and an optical module located on a light-emitting path of the light source and configured to transform light emitted by the light source to form one or more projection images with predetermined patterns, text, and/or dynamic effects. The wireless communication module is configured to wirelessly communicate with an external electronic device and at least one microphone, for receiving a first audio signal emitted by the external electronic device and a second audio signal emitted by the at least one microphone. The control module is electrically connected to the projection mechanism, the wireless communication module and the speaker module, and configured to control a projection of the projection mechanism, and output the first and second audio signals via the speaker module.

18 Claims, 18 Drawing Sheets

(51) Int. Cl.

| | |
|---|---|
| ***F21V 33/00*** | (2006.01) |
| ***H04R 1/02*** | (2006.01) |
| ***H04R 3/00*** | (2006.01) |
| ***H05B 45/10*** | (2020.01) |
| ***H05B 47/16*** | (2020.01) |
| ***H05B 47/19*** | (2020.01) |

(56) References Cited

U.S. PATENT DOCUMENTS

| | | | | |
|---|---|---|---|---|
| 2019/0157894 | A1* | 5/2019 | Shalaby .................. | H02J 7/865 |
| 2023/0297324 | A1* | 9/2023 | Yu ............................ | H04R 3/12<br>700/94 |
| 2024/0185481 | A1* | 6/2024 | Lindholm .............. | G11B 27/10 |

* cited by examiner

LED1

PROJECTION LAMP

CROSS-REFERENCE TO RELATED APPLICATIONS

The present application is a continuation-in-part of U.S. Ser. No. 19/214,104, field on May 21, 2025, and entitled "Projection Lamp with Multiple Light Effects", now pending; and claims a priority of CN 2026102054244, field on Feb. 11, 2026; and a priority of CN 2026202645926, field on Mar. 4, 2026; the entire disclosures of which are incorporated herein by reference.

TECHNICAL FIELD

This application relates to the field of projection equipment technology, particularly to a projection lamp.

BACKGROUND

Projection lamps, as devices that combine visual decoration and audio playback functions, are widely used in scenarios such as home gatherings and KTV entertainment. Existing projection lights can usually play built-in music or wirelessly connect external devices such as mobile phones to play background music, combined with projection images to create an atmosphere, but the functions that can be achieved are relatively limited.

SUMMARY

This application provides a projection lamp and its control method, aiming to solve the problem that existing projection lamps can usually play built-in music or wirelessly connect external devices such as mobile phones to play background music, and create an atmosphere by combining projection images, but the achievable functions are relatively limited.

A projection lamp includes a projection mechanism, a wireless communication module, a speaker module; and a control module. The projection mechanism includes a light source, and an optical module located on a light-emitting path of the light source and configured to transform light emitted by the light source to form one or more projection images with predetermined patterns, text, and/or dynamic effects. The wireless communication module is configured to wirelessly communicate with an external electronic device and at least one microphone, for receiving a first audio signal emitted by the external electronic device and a second audio signal emitted by the at least one microphone. The control module is electrically connected to the projection mechanism, the wireless communication module and the speaker module, and configured to control a projection of the projection mechanism, and output the first and second audio signals via the speaker module.

Compared to existing technologies, this application solves the need for simultaneous playback of "background music+vocals (human voice)" in scenarios such as karaoke and family gatherings by simultaneously receiving audio signals from external electronic devices (such as mobile phones) and microphones and playing them synchronously. Users do not need to frequently switch devices, and the operation is convenient, achieving an immersive experience of singing and matching the background music.

The control module synchronously adjusts the pattern, dynamic effect, and color of the projected image based on the characteristics of two audio signals (such as rhythm, volume, and tone), so that the projected image resonates with the sound at the same frequency (such as when the background music rhythm is fast, the dynamic effect of the projected image is accelerated; when the human voice tone is high, the color of the projected image becomes brighter), enhancing the user's audio-visual immersion.

By integrating projection function (multiple predetermined screens), multi audio reception and playback function (external electronic devices+microphones), intelligent control function (audio-visual synchronization), compact structure, suitable for various scenarios such as family gatherings, KTV entertainment, outdoor leisure, etc., it has a wide market application prospect.

BRIEF DESCRIPTION OF THE DRAWINGS

In order to explain the technical solutions of the embodiments of the present disclosure more clearly, the following will briefly introduce the accompanying drawings used in the embodiments. Apparently, the drawings in the following description are only some embodiments of the present disclosure. Those of ordinary skill in the art can obtain other drawings based on these drawings without creative work.

DISCLOSURE

Figure 22:
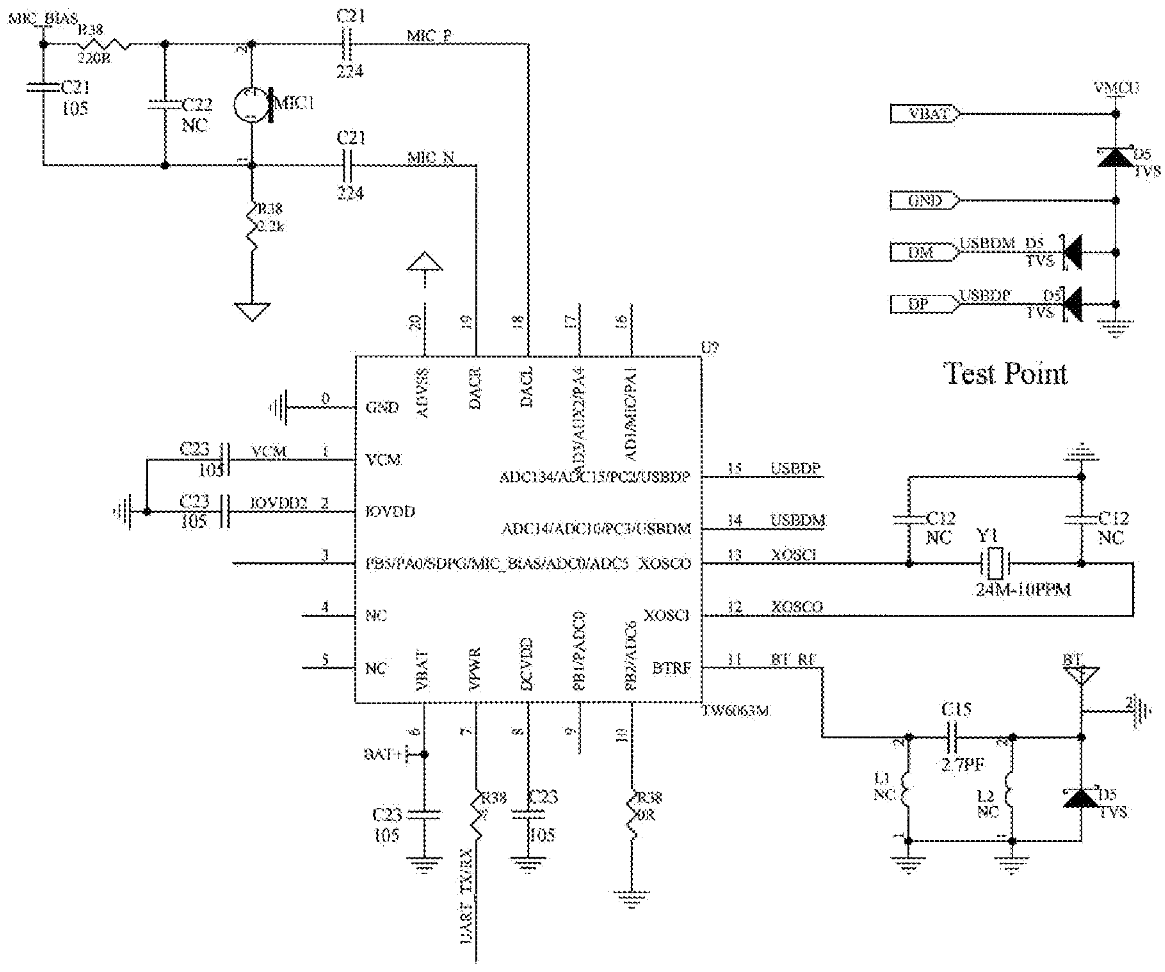

FIG. 22 is a schematic circuit diagram relating to the main control Bluetooth audio SoC (System on Chip) core circuit of a provided microphone according to an embodiment of the present disclosure.

Figure 23:
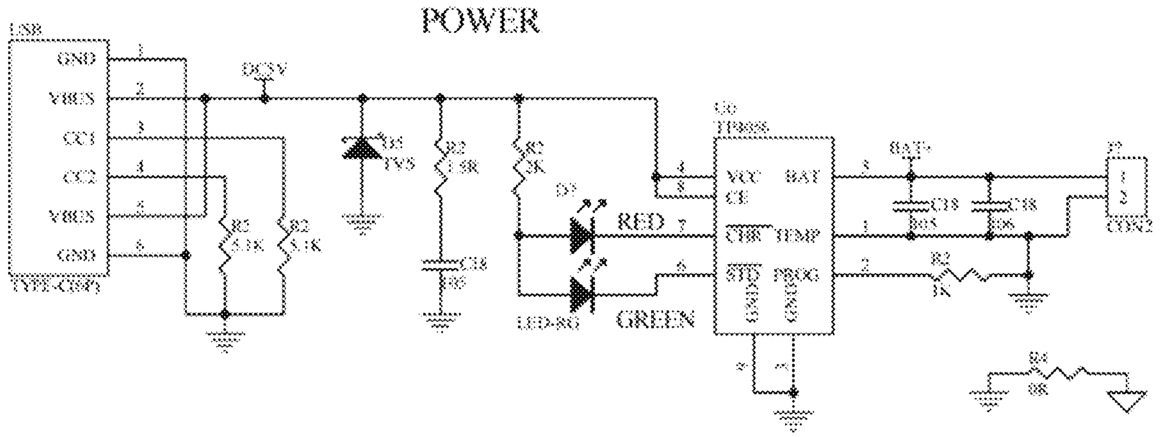

FIG. 23 is a schematic circuit diagram relating to a power input and lithium battery charging management circuit of a provided microphone according to an embodiment of the present disclosure.

Figure 24:
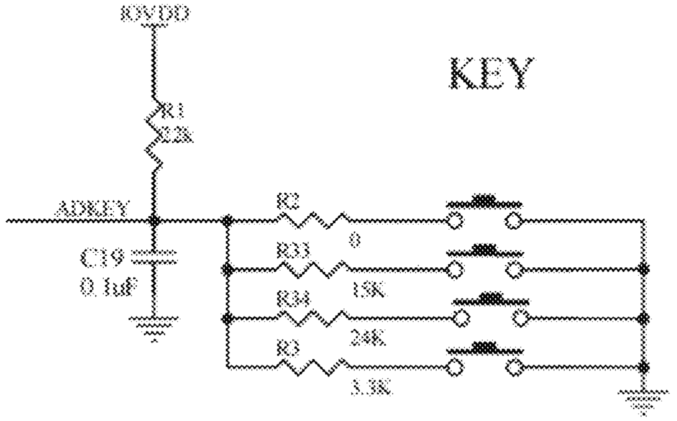

FIG. 24 is a schematic circuit diagram relating to button input and ADC (Analog-to-Digital Converter) recognition circuit a provided microphone according to an embodiment of the present disclosure.

Drawing references:

References: housing 1; speaker hole 11; first opening 12; second opening 13; power connecting hole 14; power socket 15; projection hole 16; transparent protective cover 17; control button group 18; main control board 2; speaker module 3; projection mechanism 4; first motor 41; drive shaft 411; first grating element 42; hexahedrons 421; first projection lens 43; vortex shaped cross-section 431; first light source 44; first light source driving board 441; first LED light source 442; third light source 45; second light source driving board 451; second LED light source 452; focusing cup 453; third grating element 46; second projection lens 47; lens holder 471; plate-shaped lens 472; convex lens 473; second light source 48; second grating element 49; wireless communication module 5; control module 6; linkage 7; external electronic device 8; microphone 9.

DETAILED DESCRIPTION OF THE EMBODIMENTS

The accompanying drawings in the embodiment of the present disclosure are combined, The technical scheme in the embodiment of the present disclosure is clearly and completely described, Obviously, the described embodiment is only a part of the embodiment of the present disclosure, but not all embodiments are based on the embodiment of the present disclosure, and all other embodiments obtained by ordinary technicians in the field on the premise of not doing creative work belong to the protection range of the present disclosure.

In order to make the above objectives, features, and advantages of the present application more obvious and understandable, the following will provide further detailed explanations of the present application in conjunction with the accompanying drawings and specific implementation methods.

The present invention aims to provide projection lamps that not only play built-in music or wirelessly connect external devices such as mobile phones to play background music, create an atmosphere by combining projection images, but achieve functions by simultaneously receiving audio signals from external electronic devices (such as mobile phones) and microphones and playing them synchronously, the need for "background music+vocals (human voice)" to be played simultaneously in scenarios such as karaoke and family gatherings is solved, such that users do not need to frequently switch devices, and the operation is convenient, achieving an immersive experience of singing and matching the background music.

Referring to FIGS. 1 to 5 and FIG. 9, the embodiment of present application provides a projection lamp, including a housing 1 and a main control board 2, a projection mechanism 4, and a speaker module 3 arranged inside the housing 1. The main control board 2 is provided with a wireless communication module 5 and a control module 6. The projection mechanism 4 includes a light source and an optical module located on the light-emitting path of the light source, which decomposes the light emitted by the light source to form multiple projection images with predetermined patterns, text, and/or dynamic effects. The wireless communication module 5 is used to wirelessly communicate with an external electronic device 8 and at least one microphone 9, receiving a first audio signal emitted by the external electronic devices 8 and a second audio signal emitted by the at least one microphone 9.

The speaker module 3 serves as an audio output unit, receiving audio signals from the control module 6 and completing playback, with the played sound propagating outward through the speaker hole 11 at the bottom of the housing 1. The control module 6 is electrically connected to the projection mechanism 4, the wireless communication module 5 and the speaker module 3, and is used to control the projection of the projection mechanism 4 as well as to simultaneously output the first and second audio signals via the speaker module 3.

In practical use, the control module 6 can simultaneously and in real-time receive audio signals from external electronic devices (such as smartphones) and microphones via the wireless communication module 5, and output corresponding background music and vocals through the speaker module 3. This addresses the need to play "background music+vocals" simultaneously in scenarios like karaoke or family gatherings, eliminating the need for frequent device switching and delivering a convenient "sing-and-match" immersive experience. Additionally, the control module 6 can dynamically adjust the projection patterns, dynamic effects, and colors based on the characteristics (such as rhythm, volume, and pitch) of the audio signals from external electronic devices and microphones, creating a "resonant synchronization" between the projected visuals and sound (e.g., accelerating dynamic effects when background music has a faster tempo or brightening projection colors when vocal pitch rises), enhancing the user's audiovisual immersion.

In some embodiments, as shown in FIGS. 3 to 9, the optical module includes a first motor 41 and a first grating element 42 connected to the first motor 41, both arranged within the housing 1, as well as at least one projection lens embedded in the housing 1. The light source includes a first light source 44, which is positioned within the first grating element 42. The drive shaft 411 of the first motor 41 is connected to a hole of the first grating element 42, when the drive shaft 411 of the first motor 41 rotates, it drives the first grating element 42 to rotate synchronously around its central axis, causing the first grating element 42 to rotate relative to the first light source 44. The light emitted by the first light source 44 passes through the first grating element 42 and the first projection lens 43 to project outward, forming a first dynamic projection image.

Figure 1:
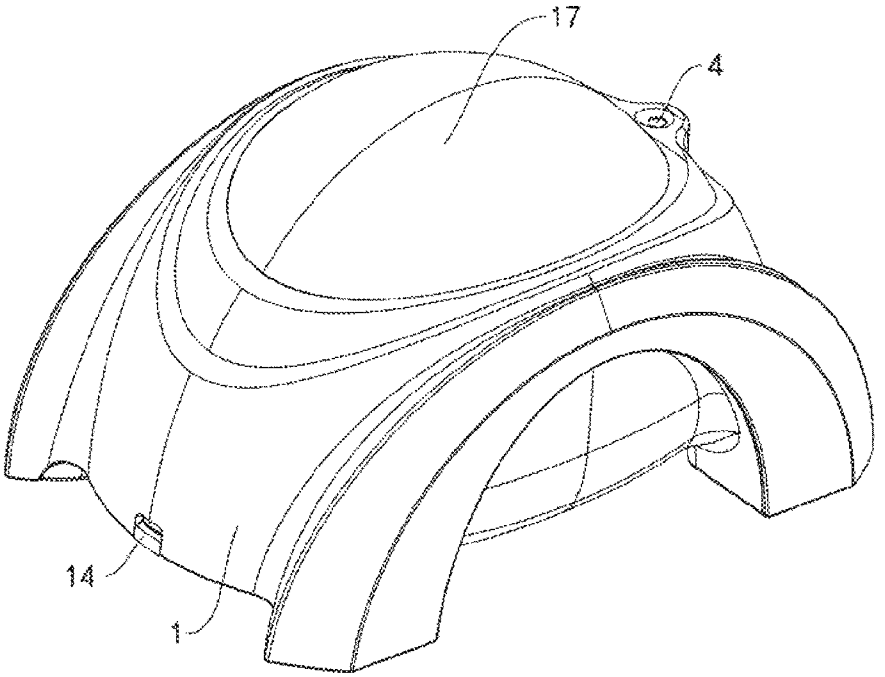
FIG. 1 is a schematic view of a projection lamp according to an embodiment of the present disclosure.
Figure 2:
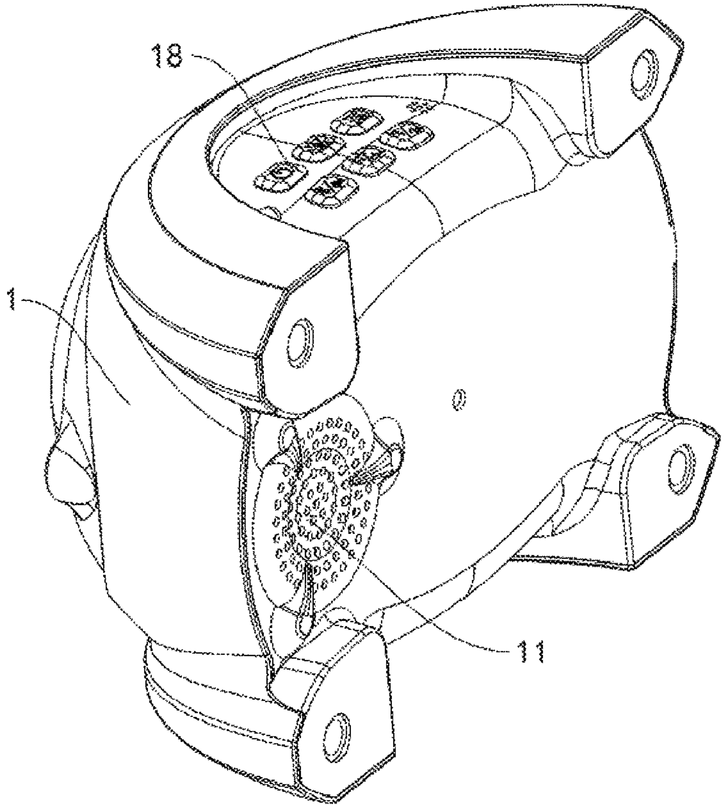
FIG. 2 is another view of the projection lamp of FIG. 1.
Figure 3:
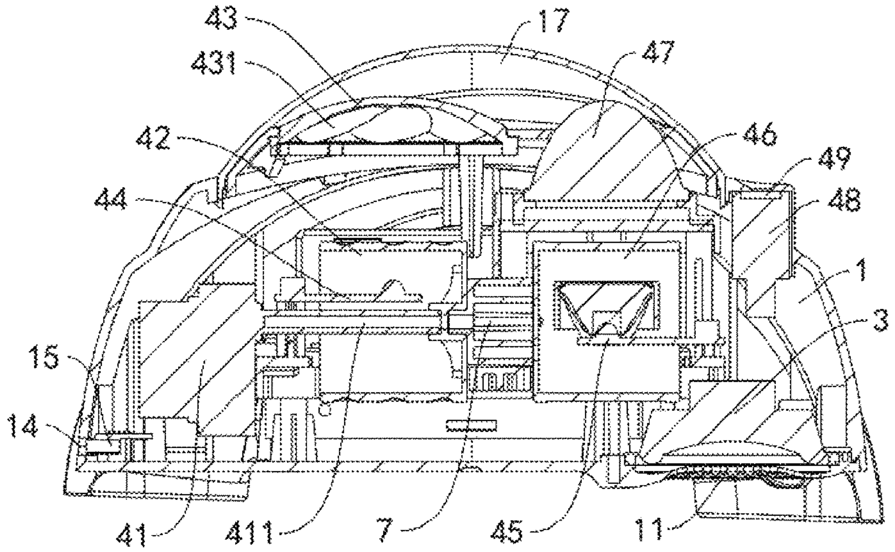
FIG. 3 is a cross-sectional view of the projection lamp of FIG. 1.
Figure 4:
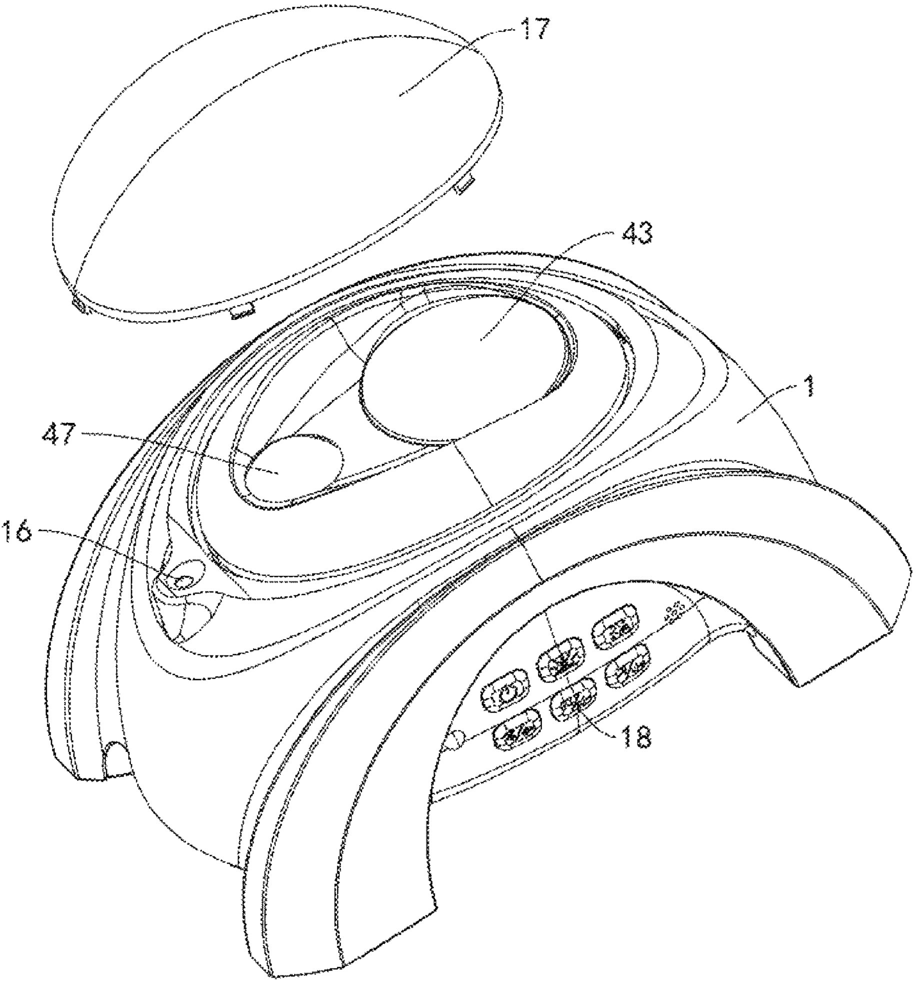
FIG. 4 is a partially exploded view of the projection lamp of FIG. 1.
Figure 5:
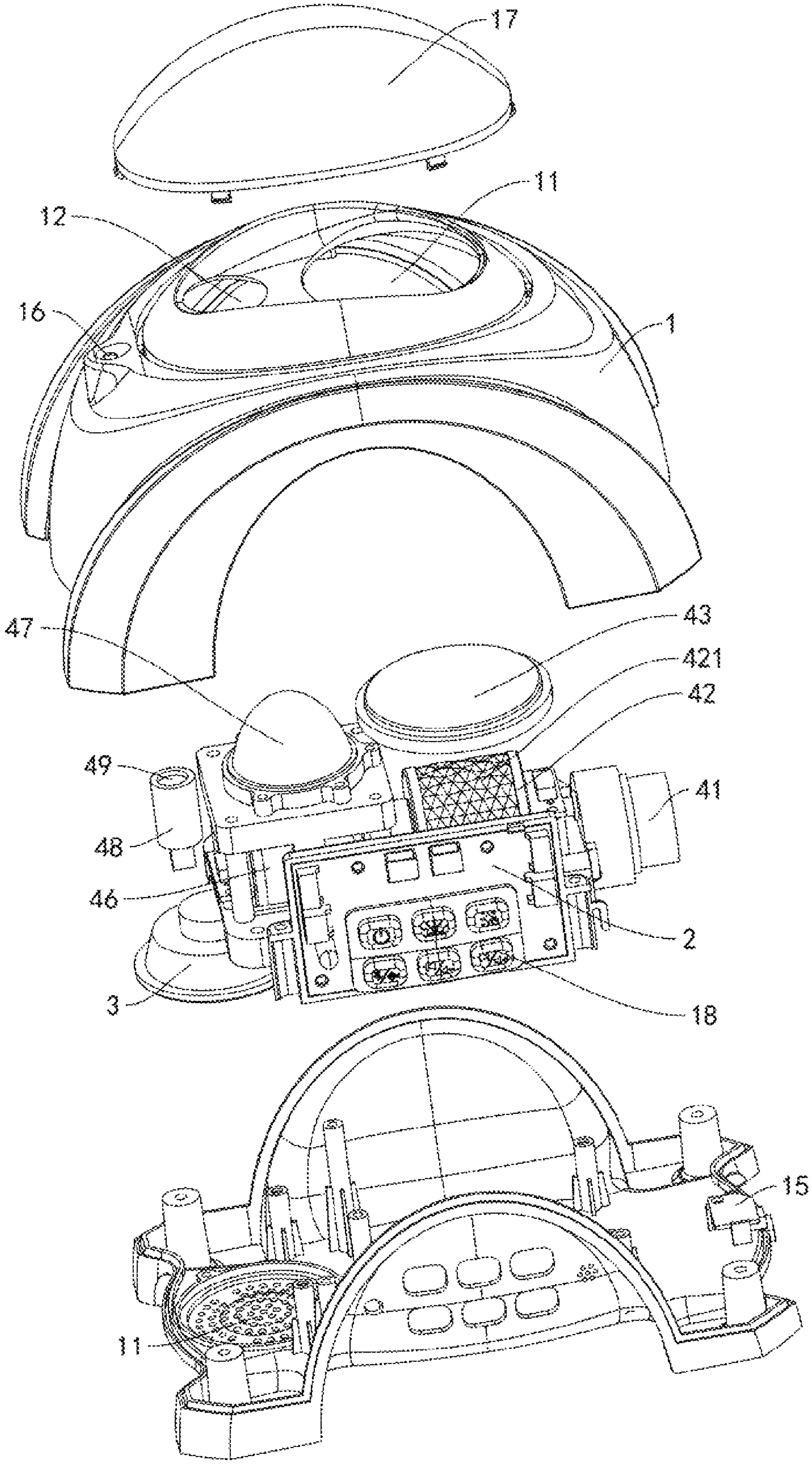
FIG. 5 is a further exploded view of the projection lamp of FIG. 4.
Figure 6:
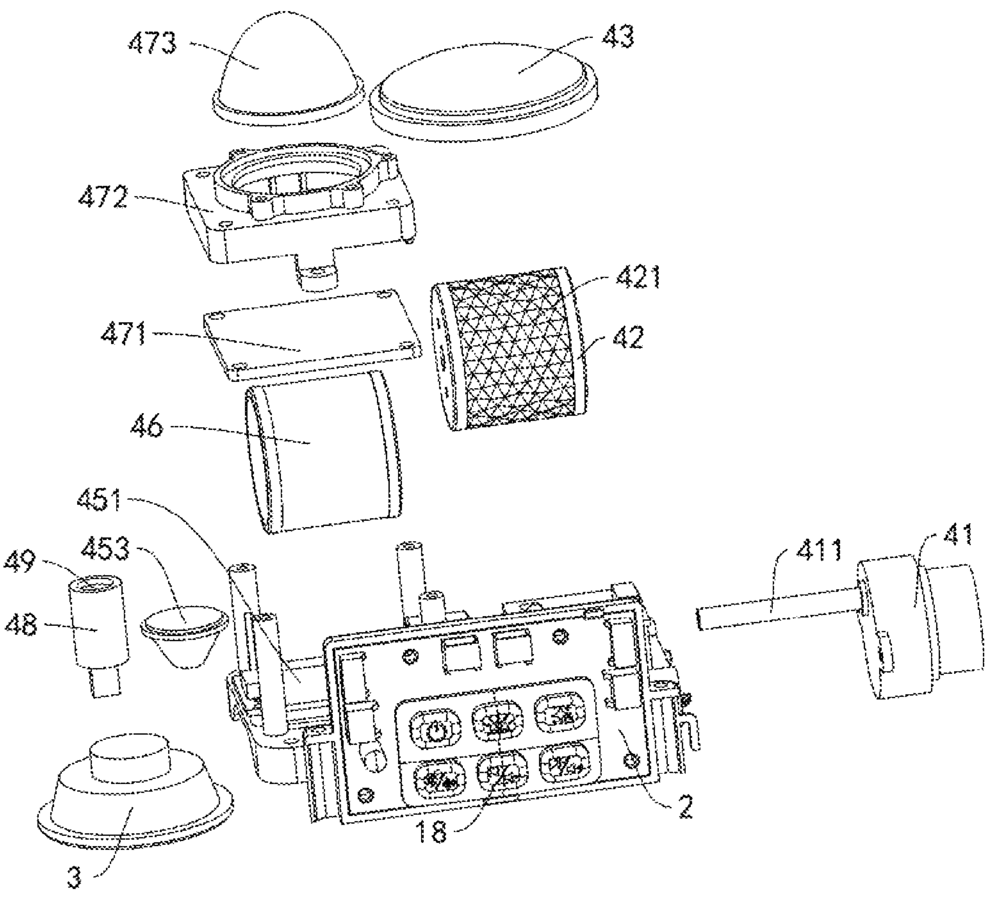
FIG. 6 is a schematic view showing inner structure of the projection lamp of FIG. 1.
Figure 7:
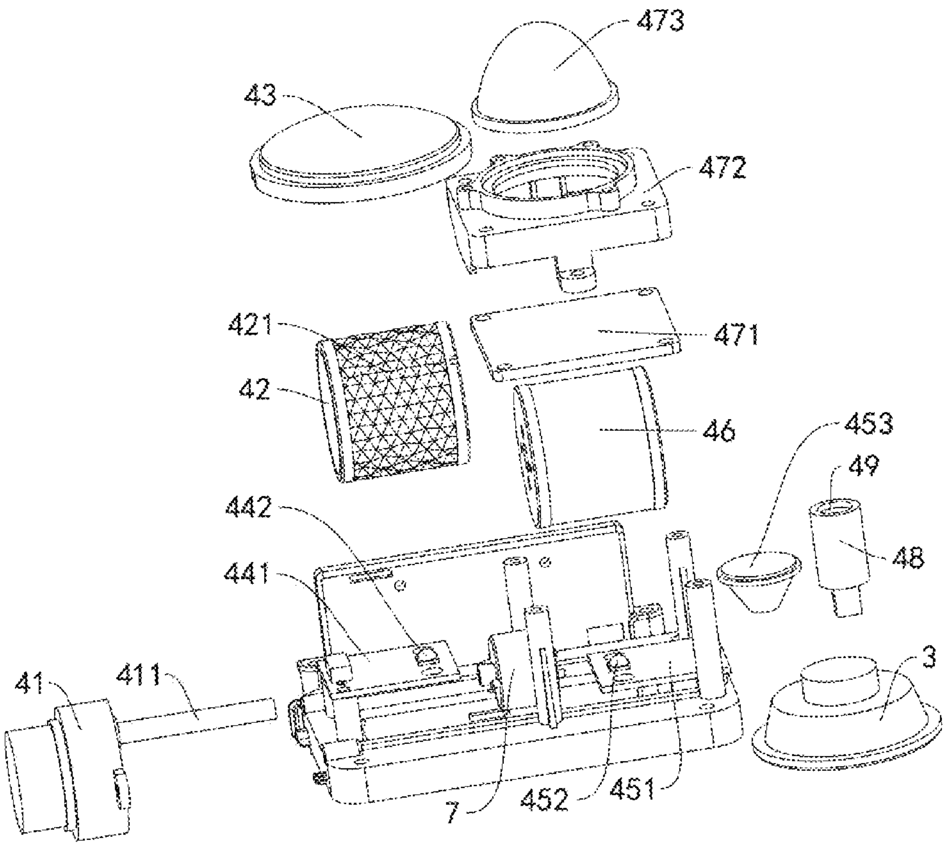
FIG. 7 is another view of FIG. 6.
Figure 8:
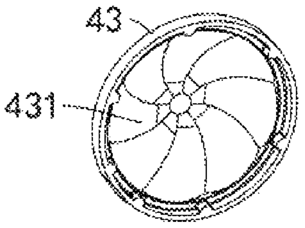
FIG. 8 is a schematic view of a first projection lens of the projection lamp according to an embodiment of the present disclosure.
Figure 9:
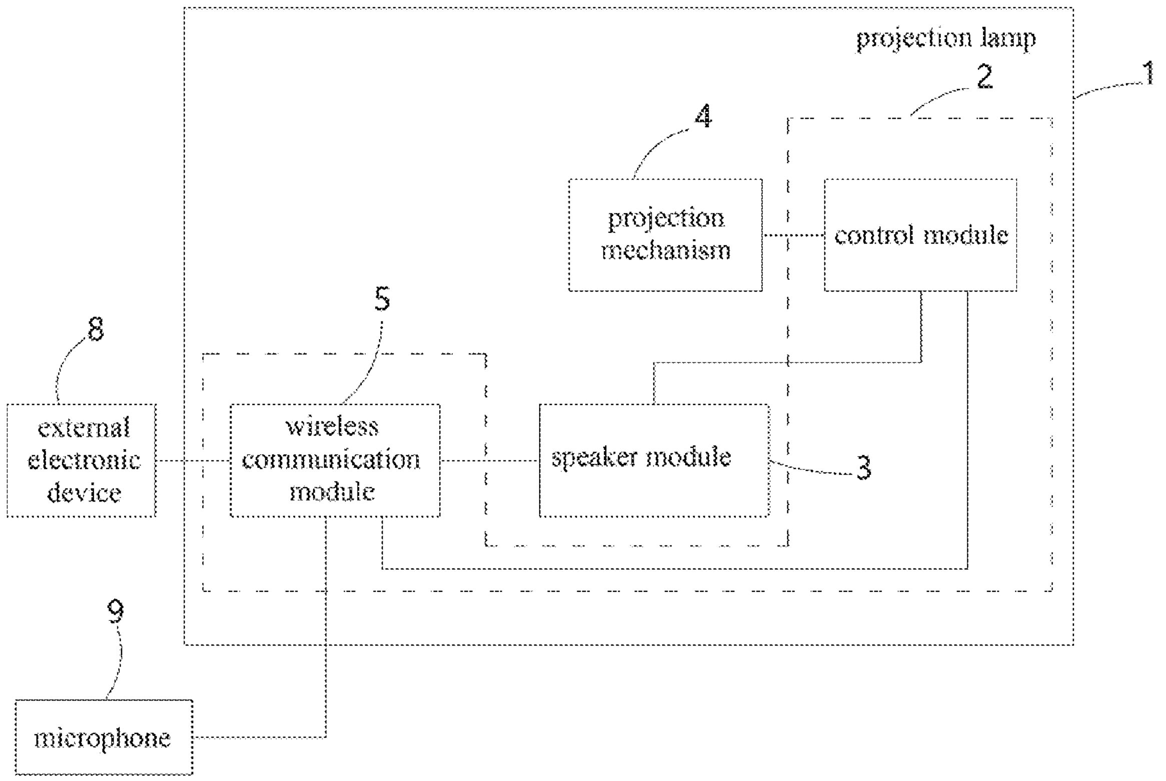
FIG. 9 is a schematic module diagram of the projection lamp according to an embodiment of the present disclosure.

In work, the control module 6 controls the light emission state (on/off, brightness) of the first light source 44 and the rotation state of the optical module (motor speed, start/stop) in a targeted manner based on the first audio signal and/or the second audio signal, in order to accurately achieve dynamic projection of the image under the synergistic effect of the light emission state of the first light source 44 and the rotation state of the optical module. The dynamic effect of the image is precisely linked with the audio signal, thereby improving the dynamic projection effect and providing users with a dual visual and auditory experience. At the same time, the core hardware is adapted to meet the requirements of miniaturization and low-power design, the overall projection lamp is powered by a DC5V power supply, which matches the product parameters of DC5V power supply and 5 W output; the first light source 44 used is a low-power LED light source to reduce energy consumption. Among them, as shown in FIG. 1, FIG. 3, and FIG. 5, there is a power connecting hole 14 on one side of the housing 1. The external power supply plug is inserted into the power socket 15 in the housing 1 through the power connecting hole 14, and the power socket 15 is electrically connected to the main control board 2 through a circuit to supply power to the electrical components in the projection lamp.

The wireless communication module 5 transmits the first and second audio signals to the control module 6, which analyzes the beat and volume characteristics of the audio signals and generates corresponding control commands.

If the optical module is controlled based on the audio signal, the control module 6 adjusts the speed of the first motor 41 according to the audio rhythm, for example, fast-paced audio corresponds to a speed of 10 r/min of the first motor 41, and slow-paced audio corresponds to a speed of 5 r/min of the first motor 41. When the audio pauses, the first motor 41 is controlled to stop rotating, and the projection image becomes static.

If the first light source 44 is controlled based on the audio signal, the control module 6 adjusts the brightness of the first light source 44 according to the audio volume. If the volume is ≥80%, the light source is at full brightness; if the volume is ≤50%, the light source is at half brightness; if the audio is muted, the light source is controlled to turn off.

The control module 6 can simultaneously achieve audio linkage between the light source and the optical module, or independently turn off the linkage function by independently adjusting the brightness of the light source and the motor speed through the control module 6, the light can be projected separately.

Among them, the housing 1 is provided with a first opening 12, and the lens end of the first projection lens 43 passes through the first opening 12 and is exposed outside the housing 1. In order to provide protection for the projection lens, the housing 1 is covered with a transparent protective cover 17 for protecting optical components such as the projection lens. The transparent protective cover 17 can prevent damage to the projection lens and improve the safety of device use.

Preferably, the first light source 44 includes a first light source driving board 441 and a first LED light source 442 arranged on the first light source driving board 441; the outer surface of the first grating element 42 is provided with several continuously arranged hexahedrons 421. As the first grating element 42 continues to rotate, the light emitted by the first light source 44 is projected outward through the rotating first grating element 42, forming a three-dimensional hexagonal continuous rotation projection visual effect. At the same time, the inner surface of the first projection lens 43 is provided with a vortex shaped cross-section 431 that converges towards the center. When the light source emitted by the first light source 44 is emitted outward through the first grating element 42 and the first projection lens 43, a dynamic light effect of hexagonal rotation and convergence towards the center can be achieved, that is, the aurora effect is formed, and the dynamic projection effect is excellent.

Furthermore, in this embodiment, the first grating element 42 is a transparent cylindrical structure. The first light source driving board 441 of the first light source 44 is horizontally installed in the first grating element 42 through the cylinder opening of the first grating element 42, so that the first LED light source 442 located on the first light source driving board 441 is located inside the first grating element 42, thereby ensuring that the light emitted by the first LED light source 442 is projected outward through the rotating first grating element 42. The outer surface of the first grating element 42 is provided with several continuously arranged hexahedrons 421, forming a three-dimensional hexagonal continuous rotating projection visual effect.

In some embodiments, as shown in FIGS. 3 to 7 and FIG. 9, the light source further includes a third light source 45 and a movable third grating element 46. The third light source 45 is located inside the third grating element 46, which is connected to the first grating element 42 via a linkage 7. The housing 1 is equipped with a second projection lens 47 corresponding to the third grating element 46, and the lens end of the second projection lens 47 passes through the second opening 13 of the housing 1 and is exposed outside the housing 1. Correspondingly, the second projection lens 47 is also located inside the transparent protective cover 17, which can provide protection for all projection lenses. When the first motor 41 rotates, its driving shaft 411 can drive the first grating element 42 to rotate, and at the same time, drive the third grating element 46 to rotate through the linkage 7, so that the light emitted by the third light source 45 passes through the moving third grating element 46, the fixed second projection lens 47, and the transparent protective cover 17 to generate a third dynamic projection image outward, and the projection area of the third projection image at least partially overlaps with the projection area of the first dynamic projection image. The control module 6 controls the emission of the third light source 45 and/or the movement of the third grating element 46 based on the first audio signal and/or the second audio signal.

That is, on the basis of aforementioned embodiments, this embodiment adds the third light source 45 and the movable third grating element 46 to form the third projection image. The projection areas of the first projection image and the third projection image at least partially overlap, achieving multi-images overlay to form multi-level dynamic lighting effects and improve dynamic projection effects. The control module 6, based on the first audio signal and/or the second audio signal, simultaneously controls the light emission state (on/off, brightness) of the third light source 45 and/or the motion state (speed, start/stop) of the third grating element 46. Through the coordinated control of multiple gratings and light sources, multi-level and multi form projection image rhythm is achieved, improving the dual visual and auditory experience. All newly added hardware is designed with low power consumption and compatible with DC5V power supply. The third light source 45 used is a low-power LED light source to reduce energy consumption.

The control module 6 analyzes the comprehensive characteristics of frequency, beat, and volume of the first audio signal and/or the second audio signal, and generates linkage control instructions for the third light source 45 and the third grating element 46, with the control logic of the first light source 44 and the optical module remaining unchanged.

For the third grating element 46: the control module 6 controls its motion state according to the audio frequency, and adjusts the motion speed corresponding to the beat change; for the third light source 45: the control module 6 adjusts its brightness and color according to the audio volume; when the volume increases, it switches to high brightness color light, and when the volume decreases, it switches to low brightness monochrome light.

This embodiment can control module 6 to turn off the audio linkage function between the third light source 45 and the third grating element 46 to independently adjust their working status, or turn off the third projection image separately, only retaining the overlay effect of other projection images, to meet the visual needs of different scenes.

Preferably, the second projection lens 47 comprises a lens holder 471, a plate-shaped lens 472, and a convex lens 473. The plate-shaped lens 472 is arranged inside the lens holder 471, while the convex lens 473 is arranged at the top of the lens holder 471 and its lens end is exposed outside the housing 1 through the second opening 13 of the housing 1. Among them, the surface of the plate-shaped lens 472 is equipped with continuous uneven structures, achieving dynamic light effects of water ripples/nebulae; at the same time, the first projection image is located in the middle of the second projection image, ensuring the visual effect of the overall light effect superposition of the projection lamp.

Furthermore, the third light source 45 includes a second light source driving board 451, a second LED light source 452 mounted on the second light source driving board 451, and a focusing cup 453 mounted on the second LED light source 452. The focusing cup 453 can enhance the projection clarity of the light effect. In addition, in this embodiment, the third grating element 46 also has a transparent cylindrical structure, and the outer surface of the third grating element 46 has a dense irregular convex concave shape.

The second light source driving board 451 of the third light source 45 is horizontally installed in the third grating element 46 through the cylinder opening of the third grating element 46, so that the second LED light source 452 and the focusing cup 453 located on the second light source driving board 451 are located inside the third grating element 46. Therefore, under the joint action of the second LED light source 452 and the focusing cup 453, the light is projected outward through the rotating third grating element 46, and the outer surface of the third grating element 46 is in a dense irregular convex concave shape, thereby forming a dynamic nebula light effect and achieving a nebula projection effect.

In some embodiments, as shown in FIGS. 3 to 7 and 9, the light source further includes a second light source 48 and a second grating element 49. The light emitted by the second light source 48 generates a second projection image through the second grating element 49. Among them, the second light source 48 and the second grating element 49 are located on the side of the third grating element 46 away from the first grating element 42, that is, the third light source 45 is located between the first light source 44 and the second light source 48. The control module 6 controls the light emission of the second light source 48 according to the first audio signal and/or the second audio signal.

On the basis of the above embodiments, this embodiment adds a second light source 48 and a second grating element 49 to form a second projection image, and the projection areas of the first and second projection images at least partially overlap, achieving three images overlay effect. The control module 6, based on the first audio signal and/or the second audio signal, selectively controls the light emission state (on/off, brightness) of the second light source 48. By adjusting the light emission of the second light source 48, the rhythmic changes of the superimposed projection image are achieved, further enriching the visual effect.

The projection mechanism 4 is provided with a second light source 48 and a second grating element 49. The second grating element 49 is a fixed/rotating structure, and the light emitted by the second light source 48 is projected through the second grating element 49 to form a second projection image. The center area of the second projection image overlaps with that of the first projection image. Through the coordinated control of the three gratings and three light sources, multi-level and multi form projection image rhythm is achieved. All newly added hardware is designed with low power consumption and is compatible with DC5V power supply.

Among them, the control module 6 analyzes the frequency characteristics of the first audio signal and/or the second audio signal, generates control instructions for the second light source 48, and the control logics of the first light source 44, the third light source 45, the first grating and the third grating, and the first motor 41 are the same as the above embodiment.

The control module 6 adjusts the lighting state of the second light source 48 according to the audio frequency: for example, when the audio frequency is high, control the second light source 48 to turn on at full brightness, and the dual screen overlay forms a high brightness composite dynamic lighting effect; when the audio is in the low frequency range, control the second light source to turn on at 48 half brightness, forming a low brightness level photosensitive effect; when the audio pauses, the second light source 48 can be controlled to turn off, leaving only the first projection image.

The audio linkage function can be turned off by controlling module 6 to independently control the brightness and brightness of the second light source 48, achieving separate/superimposed projection of dual light effects. The speaker module 3 maintains a 5 W output power specification, and audio playback is not affected by projection control.

Preferably, the second light source 48 is a laser emitter, and the second grating element 49 is a grating plate with a micro array optical structure on its surface; by combining the second light source 48 and the second grating element 49 in a stacked structure, a laser module is formed. The laser emitted by the laser emitter of the laser module can project several "small dot" images through the second grating element 49 and the projection hole 16 on the housing 1, forming a visual effect similar to a starry sky.

In some embodiments, as shown in FIGS. 2, 4, 5, 6, and 9, a control button group 18 is provided on one side of the housing 1, the electrical connection end of the control button group 18 is connected to the control module 6 of the main control board 2. Users can input different control signals (such as power on, pause, power off, sound adjustment, and brightness adjustment) to the control module 6 by operating the control button group 18, so that the control module 6 can achieve different functions according to different control signals to meet different actual user needs. Secondly, the housing 1 is also equipped with a rechargeable power module, which is connected to the main control board 2 to provide power supply for the electrical components in the projection lamp, and the main control board 2 is also equipped with a charging circuit to charge the power module.

In other embodiments, a wireless remote control can also be equipped, which establishes a signal connection with the control module 6 to achieve remote/touch based light and audio control, improving operational convenience.

Specifically, this projection lamp is an integrated device that combines visual decoration and audio interaction, the overall design adopts an integrated structure, and on the basis of the original multi light effect projection core structure, relevant modules for wireless communication, dual channel audio processing, and speaker control are added to achieve synchronous collaboration between multi light effect dynamic projection, external audio playback, and pickup sound playback of the microphone 9.

In some embodiments, the first audio signal and the second audio signal have different wireless transmission frequencies, allowing the wireless communication module 5 to simultaneously receive the first audio signal and the second audio signal.

The core design of this embodiment is to use different wireless transmission frequencies for the first audio signal and the second audio signal, and to achieve simultaneous reception of dual channel audio signals by the wireless communication module 5 through frequency discrimination, avoiding interference from signals on the same frequency and ensuring the stability of audio reception; wherein the first audio signal is the audio signal (such as accompaniment and background music) sent by the external electronic device 8, and the second audio signal is the pickup audio signal (such as voice) sent by the microphone 9. Different transmission frequencies are pre-matched and set by the wireless communication module 5, the external electronic device 8, and the microphone 9.

The projection lamp is powered on by DC5V, and after it is turned on, the wireless communication module 5 enters the pairing state. The first wireless transmission frequency is assigned to the external electronic device 8 (mobile phone/tablet) in advance, and the second wireless transmission frequency is assigned to the microphone 9; the two frequencies are non overlapping civilian wireless frequency bands.

The external electronic device 8 and the microphone 9 are paired with the wireless communication module 5 of the projection lamp; after pairing, the external electronic device 8 sends the first audio signal at a first frequency, and the microphone 9 sends the second audio signal at a second frequency.

The wireless communication module 5 simultaneously recognizes and receives the first and second audio signals of different frequencies without signal interference, and synchronously transmits the dual audio signals to the control module 6.

After the control module 6 performs fusion processing on dual audio signals, they are transmitted to the speaker module 3 with 5 W output power for synchronous playback; the projection light can simultaneously turn on the projection light effect and adjust the light effect mode separately, or only turn on the audio playback function.

In some embodiments, the wireless communication module 5 includes a dual-mode wireless communication chip and at least one antenna electrically connected to the dual-mode wireless communication chip. The at least one antenna is used to receive the first audio signal emitted by the external electronic device 8 and the second audio signal emitted by the microphone 9. The dual-mode wireless communication chip is used to demodulate the first audio signal and the second audio signal and provide them to the control module 6.

This embodiment aims at the hardware composition and signal processing logic of the wireless communication module 5, which adopts a hardware architecture of a dual-mode wireless communication chip and at least one antenna. The antenna is a unified receiving end for dual audio signals, and the dual-mode wireless communication chip has dual signal demodulation capabilities. It can demodulate and process the received first and second audio signals separately, convert them into electrical signals recognizable by the control module 6, without the need for additional chips, simplify the hardware structure, and adapt to the miniaturization design of projection lamps.

The wireless communication module 5 of the projection lamp is provided with a dual-mode wireless communication chip (adapted to Bluetooth communication protocol), and is provided with 1-2 high gain antennas. The antennas are fixed on an unobstructed area inside the housing 1 to ensure signal reception effect; and the module is powered by a DC5V power supply module.

The antenna simultaneously receives the first audio signal from the external electronic device 8 and the second audio signal from the microphone 9, and transmits the mixed signal to the dual-mode wireless communication chip.

The dual-mode wireless communication chip separates the mixed signal, performs demodulation processing on the first and second audio signals respectively, and synchronously transmits the demodulated electrical signal to the control module 6.

After the control module 6 fuses (fusion processing) and adjusts the gain of the demodulated dual channel electrical signals, they are transmitted to the speaker module 3 with 5 W output power for synchronous playback. The chip demodulation process does not affect the independent operation of the projection mechanism 4, and the projection light effect can be turned on separately or adjusted synchronously with the audio playback.

In some embodiments, the wireless communication module 5 includes a first wireless communication chip, a second wireless communication chip, and at least one antenna electrically connected to the first wireless communication chip and the second wireless communication chip. The at least one antenna is used to receive the first audio signal emitted by the external electronic device 8 and the second audio signal emitted by the microphone 9. The first wireless communication chip is used to demodulate the first audio signal and provide it to the control module 6. The second wireless communication chip is used to demodulate the second audio signal and provide it to the control module 6.

The core of this embodiment is that the wireless communication module 5 adopts a hardware architecture of dual wireless communication chips and at least one antenna. The antenna serves as a unified receiving end to receive dual audio signals, and the two wireless communication chips realize the division of signal demodulation processing. The first wireless communication chip is dedicated to demodulating the first audio signal, and the second wireless communication chip is dedicated to demodulating the second audio signal, improving the demodulation efficiency and accuracy of dual audio signals, avoiding the processing pressure of single chip demodulation, and adapting to high fidelity audio playback requirements.

The wireless communication module 5 of the projection lamp is equipped with first and second Bluetooth wireless communication chips, sharing one receiving antenna. Both chips are electrically connected to the control module 6 and powered by a DC5V power supply module.

After receiving the first audio signal from the external electronic device 8 and the second audio signal from microphone 9, the antenna simultaneously transmits the mixed signal to two wireless communication chips.

The first wireless communication chip only demodulates the first audio signal, while the second wireless communication chip only demodulates the second audio signal. The two chips synchronously transmit the demodulated electrical signal to the control module 6.

The control module 6 fuses and denoises the dual demodulated electrical signals, and synchronously plays them through the speaker module 3 with 5 W output power. Dual chip division of demodulation can reduce signal delay and ensure synchronization between vocals and accompaniment. The projection mechanism 4 can work independently to achieve separate projection of lights.

In some embodiments, the wireless communication module 5 is a Bluetooth wireless communication module 5; the first audio signal and the second audio signal both use 2.4G private wireless communication protocol and have different frequency bands.

This embodiment specifies the type and transmission protocol of wireless communication module 5, the core design is that wireless communication module 5 adopts Bluetooth wireless communication module 5, the first and second audio signals both use 2.4G private wireless communication protocol and are allocated different frequency bands. Based on the stability of 2.4G private protocol and frequency band differentiation, dual channel audio signals can be transmitted simultaneously without interference, which is suitable for the use scenario of civilian wireless devices and is compatible with the Bluetooth microphone 9 connection design of the product.

The projection lamp adopts Bluetooth wireless communication module 5 as the core wireless communication component; the preset wireless transmission protocol of the module is 2.4G private wireless communication protocol; at the same time, two different sub bands (such as 2.402 GHz and 2.480 GHz) under this protocol are allocated to the first and second audio signals, and the sub bands do not overlap with each other.

The external electronic device 8 and the microphone 9 are both compatible with the 2.4G private wireless communication protocol; after pairing with Bluetooth wireless communication module 5, the external electronic device 8 sends the first audio signal in the first sub-band, and the microphone 9 sends the second audio signal in the second sub-band. The Bluetooth wireless communication module 5 simultaneously receives audio signals from two sub frequency bands. Due to the matching protocol and frequency band, there is no signal crosstalk, and the dual signals are transmitted to the control module 6.

The control module 6 processes dual signals and plays them through the speaker module 3 with 5 W output power, the projection lamp is powered by DC5V throughout the entire process and can independently turn on lighting effects such as starry sky and water patterns, the lighting effects and audio playback do not affect each other.

In some embodiments, the control module 6 is further used to control the operation of the light source and/or the optical module based on the first audio signal and/or the second audio signal, so that the projection image generates rhythm in conjunction with the first audio signal and/or the second audio signal.

The core of this embodiment is to achieve the rhythmic linkage between the projected image and the audio signal, the control module 6 is equipped with audio feature recognition and light effect linkage algorithms, which can analyze the characteristic parameters of the first audio signal and/or the second audio signal (such as beat, volume, frequency), and convert the parameters into control signals for the projection mechanism 4. Based on the audio features, the working state of the light source (brightness, color) and/or the working state of the optical module (rotation speed, start stop, light effect switching) are controlled to achieve rhythmic movement of the projected image with the audio, while retaining the function of independent control of the lighting.

The control module 6 of the projection lamp is equipped with an audio rhythm algorithm, which can recognize core features such as beat, volume, and frequency of audio signals; the algorithm module is powered by a DC5V power supply module and is electrically connected to the projection mechanism 4, the wireless communication module 5, and the speaker module 3.

The wireless communication module 5 transmits the received first audio signal (accompaniment) and second audio signal (human voice) to the control module 6, the control module 6 simultaneously performs feature analysis and fusion processing on the audio signal, and the fused audio signal is transmitted to the speaker module 3 with 5 W output power for playback.

The control module 6 generates projection control signals based on the analyzed audio features, such as increasing the brightness of the light source to 100% and accelerating the rotation of the grating elements in the optical module during audio downbeat; control the brightness of the light source to decrease to 50% and slow down the rotation of the grating element during audio tapping; and control the light source to switch to low brightness static lighting effect when the audio volume is below a preset value.

If only a single audio signal is played (such as accompaniment or vocals), the control module 6 can achieve light effect rhythm based on this single audio signal; if the projection function needs to be used separately, the audio linkage function can be turned off by controlling the control module 6 to achieve separate projection of different light effects for the lights.

In some embodiments, the wireless communication module 5 can simultaneously wirelessly connect two microphones 9 to receive the second audio signals emitted by the two microphones 9. The K-song audio product corresponding to the projection lamp is powered by DC5V input and 5 W output, with Bluetooth audio projection lamp; the microphones 9 can be connected to the projection starry sky sound light through Bluetooth, mainly using Bluetooth technology to achieve wireless transmission and playback of sound signals; at the same time, the light can project different lighting effects separately to achieve different atmospheric environments.

The core design of this embodiment is the multi device connection capability of the wireless communication module 5, which supports simultaneous wireless connection of two microphones 9 to achieve simultaneous reception, transmission, and processing of two second audio signals. The two second audio signals are the collected vocal signals of two microphones 9, which can be fused with the first audio signal (accompaniment) of the external electronic device 8 and played synchronously, meeting the needs of multi person karaoke/choir. The wireless communication module 5 is a Bluetooth module that supports one to two device connection and is compatible with the speaker module 3 with 5 W output power for audio fusion playback, it does not affect the projection lighting effect of audio linkage or individual control.

The Bluetooth wireless communication module 5 of the projection lamp enables one to two pairing mode, supporting two microphones 9 to establish Bluetooth connection with the module at the same time. The module is powered by a DC5V power supply module, and the signal reception distance meets the requirements of civilian interactive scenes. In the one to two pairing mode, the two microphones 9 are paired with Bluetooth wireless communication module 5, and external electronic device 8 is paired with the module at the same time; and the module simultaneously receives two second audio signals (two vocals) and one first audio signal (accompaniment) without signal interference.

Then, the Bluetooth wireless communication module 5 synchronously transmits three audio signals to the control module 6, the control module 6 performs signal fusion, noise reduction, and volume balance processing to ensure the synchronization of two human voices and accompaniment playback. The processed audio signal is transmitted to the speaker module 3 with 5 W output power to complete synchronous playback.

That is, the control module 6 can achieve rhythmic linkage of projection images based on the fused three audio signals; the audio linkage function can also be turned off to achieve separate projection of lights, meeting the needs of multi person interactive scenes such as duet singing and family gatherings, and maintaining a stable DC5V power supply throughout the entire process.

In some embodiments, the control module 6 detects through the wireless communication module 5 that whether the first audio signal emitted by the external electronic device 8 is an accompaniment signal, and whether the second audio signal emitted by the at least one microphone 9 is a human voice signal. If the control module 6 detects that the first audio signal is an accompaniment signal and the second audio signal is a human voice signal, it controls the speaker module 3 to mix and play the accompaniment signal and the human voice signal, while extracting the audio feature parameters of the accompaniment signal. Then, the control module 6 controls the brightness of the light source of the projection mechanism 4, the rotation speed of the grating of the optical module, and the switching frequency of the projection pattern based on the extracted audio feature parameters, so that the dynamic effect of the projection image is synchronized with the rhythm and tone of the accompaniment signal. If the control module 6 detects that the interruption of the human voice signal exceeds the preset duration, the control module 6 reduces the brightness of the light source and controls the optical module to switch to a static pattern; when the human voice signal is detected again, the brightness of the light source and the dynamic projection effect are restored.

The core of this embodiment is to achieve intelligent detection of accompaniment/human voice signals and adaptive rhythm linkage of projection lighting image effects, the control module 6 is equipped with an audio signal type recognition module and vocal interruption detection logic, which can accurately distinguish between the accompaniment signals and the human voice signals, and extract accompaniment feature parameters to control the projection lighting image effects, accompaniment rhythm, and tone synchronization while mixing and playing the two. At the same time, set the preset duration of voice interruption, when the voice interruption exceeds the time limit, the brightness of the light source will be automatically lowered and the static projection pattern will be switched; after the voice is restored, the dynamic light effect will be restored immediately, achieving intelligent adaptation of the light effect to the karaoke state and enhancing the interactive experience.

The projection lamp is powered on by DC5V, and the control module 6 starts the audio signal type recognition module, the wireless communication module 5 completes Bluetooth pairing with the external electronic device 8 (playing accompaniment) and the microphone 9, the module transmits the received first and second audio signals in real time to the control module 6.

The control module 6 detects the signal type through the recognition module. if it is determined that the first audio signal is an accompaniment signal and the second audio signal is a human voice signal, the dual signal is immediately transmitted to the speaker module 3 with 5 W output power for mixing processing and playback, while extracting audio feature parameters such as rhythm, pitch, and beat of the accompaniment signal.

The control module 6 generates projection control instructions based on the extracted accompaniment feature parameters: adjusts the rotation speed of the optical module grating and the switching frequency of the projection pattern according to the accompaniment rhythm, adjusts the brightness of the light source according to the accompaniment tone, so that the dynamic effect of the projection image is accurately synchronized with the accompaniment signal; and the control module 6 monitors the transmission status of human voice signals in real time, if a human voice signal interruption is detected and the interruption duration exceeds the preset duration (such as 3 seconds), control instructions including reducing the brightness of all light sources in projection mechanism 4 to the preset low brightness (such as 30%), and controlling the optical module to stop grating rotation and switch to static projection patterns (such as static starry sky, static water pattern) are immediately generated.

When the control module 6 detects the human voice signal transmitted by the microphone 9 again, it immediately restores the light source to its original brightness and controls the optical module to restart the grating rotation and pattern switching, restoring the dynamic rhythm effect of the projection image and accompaniment; if a signal of non accompaniment/vocal type is detected, the control module 6 will default to the light independent control mode, and the light effect and audio playback will not affect each other.

In some embodiments, the control module 6 identifies the second audio signal corresponding to each microphone 9 connected simultaneously through the wireless communication module 5, and assigns a unique signal identifier to each microphone 9; the control module 6 collects real-time volume amplitude data of each second audio signal and calculates the average volume amplitude of all second audio signals. The control module 6 controls the attenuation processing of the second audio signal with a volume amplitude higher than the preset threshold of the average value, and controls the gain processing of the second audio signal with a volume amplitude lower than the preset threshold of the average value, so that the volume amplitudes of all second audio signals tend to be consistent. The control module 6 mixes all the balanced second audio signals with the first audio signal, and synchronously plays them through the speaker module 3; at the same time, it controls the projection mechanism 4 to project identification patterns corresponding to the number of microphones 9 to distinguish the sound states of different microphones 9.

The core of this embodiment is to achieve automatic volume balance and visual differentiation of the vocal signals from multiple microphones 9, the control module 6 supports unique identification allocation for each second audio signal transmitted by each microphone 9, and real-time volume amplitude acquisition, by calculating the volume mean and combining it with a preset threshold, the excessively high/low vocal signals are attenuated/amplified separately to ensure consistent volume across multiple channels. At the same time, control the projection mechanism 4 to project identification patterns that match the number of microphones 9, achieving visual differentiation of different microphones 9 sound states and adapting to the scene requirements of multi person choir/karaoke.

The wireless communication module 5 of the projection lamp enables multi device Bluetooth pairing mode, completing pairing with N microphones 9 (N≥2) and external electronic devices 8. The control module 6 assigns unique signal identifiers (such as numbers 1, 2 . . . . N) to the second audio signals transmitted by each microphone 9, achieving accurately distinguish the multiple human voice signals.

The control module 6 collects real-time volume amplitude data of each identified second audio signal, calculates the average volume amplitude of all second audio signals through algorithms, and sets a preset volume balance threshold (such as ±10%).

The control module 6 compares the volume amplitude of each microphone 9 with the average value: for signals with volume amplitude higher than the average value+preset threshold, attenuation processing is performed; perform gain processing on signals with volume amplitudes below the average preset threshold until the volume amplitudes of all second audio signals converge, ensuring volume balance for multiple voices.

The control module 6 mixes the balanced second audio signals with the first audio signal (accompaniment) from the external electronic device 8, and transmits them to the speaker module 3 with 5 W output power for synchronous playback.

At the same time, the control module 6 sends instructions to the projection mechanism 4 to control the projection of unique identification patterns corresponding to the number of the microphones 9 (such as circular patterns for the microphone 91 and square patterns for the microphone 92). The identification patterns dynamically change with the corresponding sound state of the microphone 9 (such as flashing patterns when sound is heard and constantly on patterns when silent), achieving visual distinction between different sound states of microphone 9. The entire process is stably powered by DC5V.

In some embodiments, the control module 6 controls the wireless communication module 5 to receive a second audio signal from the at least one microphone 9 and transmit the second audio signal to a preset speech recognition module. The control module 6 performs speech analysis on the second audio signal through a speech recognition module, extracts key control information from the voice command, and the key control information includes at least one of projection pattern switching, light source switch, brightness adjustment, volume adjustment, and audio signal switching. The control module 6 generates corresponding control instructions based on the extracted key control information and sends them to the projection mechanism 4, the wireless communication module 5, or the speaker module 3. The control module 6 controls the speaker module 3 to play the operation confirmation voice and controls the projection mechanism 4 to project the operation confirmation pattern, if no new voice command is detected within the preset time, the current control state is maintained.

The core of this embodiment is to achieve voice command control of the projection lamp, the control module 6 integrates a voice recognition module, which can parse the second audio signal transmitted by the microphone 9 as voice control commands, extract key control information such as projection, light source, volume, and audio switching, and generate corresponding commands to control the operation of each module. At the same time, a feedback mechanism for operation confirmation is set up, which plays confirmation voice through the speaker module 3 and projects confirmation patterns through the projection mechanism 4, and when there are no new instructions, the current state is maintained, achieving contactless intelligent operation and simplifying the usage process.

The projection lamp is powered on by DC5V, and the control module 6 starts the built-in voice recognition module, this module has a preset voice command analysis library, which contains voice features for key control information such as projection pattern switching, light source switch/brightness adjustment, speaker volume adjustment, and audio signal switching.

The wireless communication module 5 completes Bluetooth pairing with at least one microphone 9, and the control module 6 controls the wireless communication module 5 to receive the second audio signal emitted by the microphone 9 and directly transmit the signal to the speech recognition module.

The speech recognition module performs speech analysis on the second audio signal, extracts key control information from voice commands (such as "switching water ripple patterns", "turning on lights", "increasing volume"), and converts the information into electrical signals that can be recognized by control module 6.

The control module 6 generates targeted control instructions based on the extracted key control information and sends them to the corresponding module: controls the projection mechanism 4 to switch patterns/adjust light source brightness, controls the wireless communication module 5 to switch audio signals, controls the speaker module 3 to adjust playback volume.

After the instruction is executed, the control module 6 immediately controls the speaker module 3 with 5 W output power to play the operation confirmation voice (such as "water ripple pattern switched" and "light brightness adjusted to 80%"), and at the same time controls the projection mechanism 4 to project the operation confirmation pattern (such as check mark pattern, pattern thumbnail), completing the operation feedback.

The control module 6 continuously monitors the transmission status of voice commands. If no new voice commands are detected within the preset time (such as 5 seconds), the current working status of all modules is locked, and the existing projection, audio, and volume settings are maintained. If further operation is required, a new voice command can be issued through the microphone 9.

In some embodiments, the control module 6 controls the light source of the projection mechanism 4 to start, driving multiple grating elements in the optical module to rotate respectively. Each grating element generates a preset projection image, which includes at least two of a starry sky pattern, a water ripple pattern, and a hexagonal dynamic pattern. The control module 6 receives the first audio signal and/or the second audio signal through the wireless communication module 5, and extracts the frequency characteristics of the audio signal. The control module 6 controls the rotation speed of different grating elements and the corresponding light source emission intensity based on the frequency characteristics of the audio signal, so that the projection areas of different preset projection images partially overlap, forming a superimposed projection effect. The control module 6 monitors the frequency changes of the audio signal, when the frequency increases, it accelerates the rotation speed of the grating element and increases the brightness of the light source; when the frequency decreases, it slows down the rotation speed of the grating element and reduces the brightness of the light source, achieving dynamic synergy between the overlay projection effect and the audio signal.

The core of this embodiment is to achieve precise linkage between the overlapping projection of multiple grating elements and the audio frequency characteristics, the control module 6 drives multiple grating elements in the projection mechanism 4 to independently rotate, generating at least two preset dynamic projection images (starry sky, water ripples, hexagons), and extracting the frequency characteristics of the audio signal. Based on the frequency, the rotation speed of different gratings and the corresponding light source emission intensity are cooperatively controlled, so that the projection areas of multiple images partially overlap to form an overlapping effect; at the same time, real-time monitoring of audio frequency changes enables adaptive adjustment of light effect parameters when the frequency increases/decreases, allowing for highly coordinated overlay projection effects and audio dynamics.

The control module 6 of the projection lamp sends a start command to the projection mechanism 4, controlling multiple sets of light sources in the projection mechanism 4 to synchronously turn on, and driving multiple grating elements (at least 2) in the optical module to independently rotate. Each grating element generates a preset dynamic projection image (such as grating 1 corresponding to the starry sky pattern, grating 2 corresponding to the water ripple pattern, grating 3 corresponding to the hexagonal dynamic pattern), the projection areas of each image are set to partially overlap, preparing for overlapping projection.

The wireless communication module 5 transmits the received first audio signal (accompaniment) and/or second audio signal (human voice) to the control module 6, and the control module 6 extracts the frequency characteristics (high frequency/mid frequency/low frequency) of the audio signal through an algorithm.

The control module 6 generates grating element-light source cooperative control instructions based on the extracted frequency characteristics: assigns corresponding frequency adapted rotation speeds to different grating elements, assigns matching luminous intensities to light sources corresponding to each grating, controls multiple images to overlap in the overlapping area, and forms a layered overlay projection effect.

The control module 6 monitors the frequency changes of audio signals in real time, if an increase in frequency is detected, it immediately accelerates the rotation speed of all grating elements and synchronously increases the corresponding light source's luminous intensity to enhance the dynamic effect of superimposed projection; if a decrease in frequency is detected, slow down the rotation speed of the grating, reduce the brightness of the light source, and allow the overlay projection effect to slowly change with the audio frequency.

The projection mechanism 4 and the control module 6 are powered by DC5V throughout the process, and the overlapping projection effect is linked in real-time with the audio signal, the linkage function can also be turned off through the control module 6, and any one/multiple preset projection images can be individually turned on to achieve separate control of lighting.

In some embodiments, the control module 6 detects in real-time the Bluetooth connection status between the wireless communication module 5 and the external electronic devices 8, the at least one microphone 9, and collects connection signal strength data. When the control module 6 detects that the Bluetooth connection signal strength of a certain device is lower than the preset threshold, it controls the wireless communication module 5 to automatically adjust the communication frequency band and send a connection stability request to the corresponding device, if the connection signal strength still does not reach the preset threshold after adjusting the frequency band, the control module 6 controls the speaker module 3 to play an unstable connection prompt voice, and controls the projection mechanism 4 to project an abnormal connection pattern, while attempting to re-establish the Bluetooth connection. When the Bluetooth connection of external electronic device 8 is detected to be disconnected, the Bluetooth connection with microphone 9 is automatically retained, and the projection mechanism 4 is controlled to switch to the exclusive projection mode corresponding to microphone 9. When a new external electronic device 8 requests connection, the microphone 9 with the lowest signal strength is first disconnected and a connection is established with the new external electronic device 8.

The core of this embodiment is to achieve intelligent monitoring and stable maintenance of Bluetooth connection status, the control module 6 is equipped with a Bluetooth connection signal acquisition module and connection priority control logic, which can real-time collect the connection signal strength between the wireless communication module 5, the external electronic devices 8, the microphone 9. When the signal strength is lower than the preset threshold, the communication frequency band will be automatically adjusted and a reconnection request will be initiated; at the same time, abnormal connection prompts will be sent out through audio and video. If the external electronic device 8 is disconnected, automatically keep the microphone 9 connected and switch to exclusive projection mode. If a new external device requests a connection, prioritize disconnecting microphone 9 with the lowest signal strength to ensure the core requirement of accompaniment playback and improve the stability and adaptability of device connection.

After the projection lamp is turned on, the wireless communication module 5 completes Bluetooth connection with the external electronic device 8 and the at least one microphone 9. The control module 6 starts the Bluetooth connection signal acquisition module to detect the Bluetooth signal strength data of each connected device in real time, and sets a preset signal strength threshold (such as −85 dBm).

If the Bluetooth connection signal strength of a certain device is detected to be below the preset threshold, the control module 6 immediately controls the wireless communication module 5 to automatically switch to the communication frequency band under 2.4G private protocol, and sends a Bluetooth connection stability request to the device, attempting to restore the signal strength.

If the connection signal strength of the device still does not reach the preset threshold after adjusting the frequency band, the control module 6 immediately controls the speaker module 3 with 5 W output power to play an unstable connection prompt voice (such as "unstable device connection, please check distance"), and controls the projection mechanism 4 to project abnormal connection patterns (such as flashing exclamation mark patterns), while continuously driving the wireless communication module 5 to attempt to re-establish Bluetooth connection.

If the control module 6 detects that the external electronic device 8 (playing accompaniment) actively disconnects the Bluetooth connection, it immediately controls the wireless communication module 5 to retain the Bluetooth connection with all microphones 9, and controls the projection mechanism 4 to switch to the exclusive projection mode of the microphone 9 (such as low brightness dynamic karaoke pattern), ensuring the normal pickup and playback of the microphone 9.

If a new external electronic device 8 requests Bluetooth connection while the microphone 9 is still connected, the control module 6 will sort the signal strength of the existing microphone 9 connections, prioritize disconnecting the microphone 9 with the lowest signal strength, and immediately establish a Bluetooth connection with the new external electronic device 8 to ensure the core requirements of accompaniment playback; at the same time, the control projection mechanism 4 to switch to the regular linkage projection mode.

In some embodiments, the control module 6 receives the first audio signal and the second audio signal through the wireless communication module 5, while collecting environmental noise signals. The control module 6 extracts features from the collected environmental noise signals and generates a noise feature model; the control module 6 performs noise reduction processing on the first audio signal and the second audio signal based on the noise characteristic model, filtering out signal components that match the environmental noise characteristics. The control module 6 performs sound quality optimization processing on the first and second audio signals after noise reduction, improving the clarity of the vocal signal and the stereoscopic effect of the accompaniment signal. The sound quality optimization processing includes enhancing a medium frequency (such as 500-2000 Hz) to a high frequency (such as 2000-8000 Hz) components of the human voice/vocal signal and balancing a frequency amplitudes of the accompaniment signal; then the control module 6 mixes the optimized first audio signal and second audio signal, and plays them through the speaker module 3, at the same time, it controls the projection mechanism 4 to switch the corresponding sound quality optimization identification projection according to the type of audio signal.

The core of this embodiment is to achieve intelligent noise reduction and sound quality optimization of audio signals, combined with visual projection of sound quality optimization indicators; the control module 6 integrates an environmental noise acquisition module and a sub signal sound quality optimization module, which can synchronously collect the first audio signal, the second audio signal, and the environmental noise signal. By extracting noise features, a noise model is generated to perform targeted noise reduction processing on the dual channel audio signal; at the same time, optimizing the classification of denoised signals enhancing high-frequency components in human voice/vocals signal, balancing the amplitude of accompaniment high and low frequencies, and improving the clarity of vocals and the three-dimensional effect of accompaniment during karaoke; finally, control the projection mechanism 4 to project the identification pattern corresponding to the sound quality optimization type, achieving visual feedback for audio optimization.

The projection lamp is powered on by DC5V, and the control module 6 starts the environmental noise acquisition module, while collecting the first audio signal (accompaniment) and second audio signal (human voice) transmitted by the wireless communication module 5, it synchronously collects the environmental noise signals around the projection lamp.

The control module 6 extracts features (such as noise frequency, amplitude, and duration) from the collected environmental noise signals, and generates an environmental noise feature model through algorithms as a reference for audio noise reduction.

The control module 6 performs targeted noise reduction processing on the first audio signal and the second audio signal based on the generated noise feature model, accurately filtering out signal components that match the environmental noise features in the dual channel audio signal, and retaining pure accompaniment and pure human voice signals.

The control module 6 starts the sub signal sound quality optimization module to perform exclusive sound quality optimization on the denoised audio signal: perform high-frequency component enhancement processing on the second audio signal (human voice) to improve the clarity and penetration of human voice; perform high and low frequency amplitude balancing processing on the first audio signal (accompaniment) to enhance the three-dimensional and layered sense of the accompaniment.

The control module 6 mixes the optimized first and second audio signals and transmits them to the speaker module 3 with 5 W output power for synchronous playback; at the same time, it sends instructions to the projection mechanism 4 to control the projection of identification patterns corresponding to sound quality optimization types (such as microphone 9 patterns for human voice optimization, musical note patterns for accompaniment optimization), achieving visual feedback for sound quality optimization.

The sound quality optimization and noise reduction process is carried out in real-time throughout the entire process, when the environmental noise changes, the control module 6 will automatically update the noise feature model to ensure the accuracy of the noise reduction effect; at the same time, the projection identification pattern will dynamically switch with the optimization focus of the audio signal type.

Figure 10:
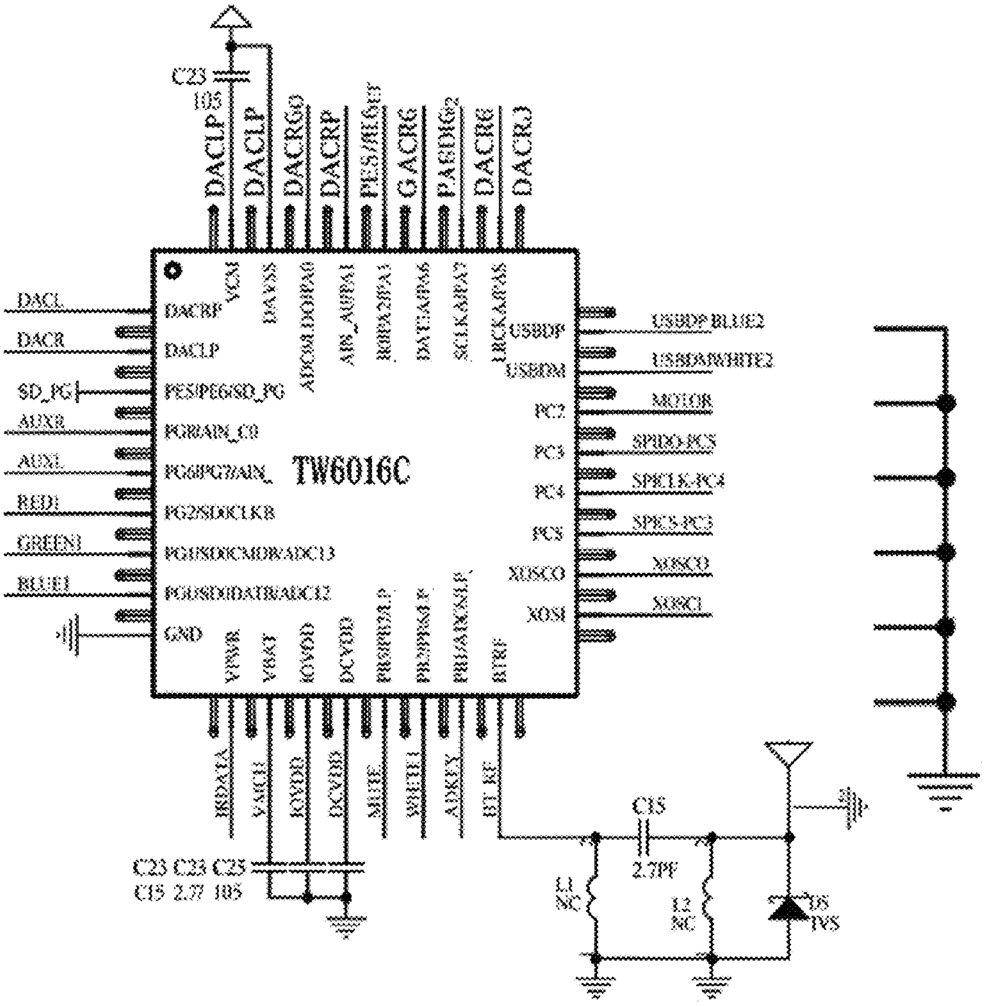
FIG. 10 is a schematic diagram of the main control Bluetooth audio processing circuit of the projection lamp according to an embodiment of the present disclosure.

In some embodiments, as shown in FIGS. 10 to 21, the circuit diagrams corresponding to the projection lamp are provided. As shown in FIG. 10, FIG. 10 is a schematic diagram of the main control Bluetooth audio processing circuit corresponding to the projection lamp, this circuit is not a single functional circuit, but the core recognition area of the entire projection lamp's brain, used to perform any of the relevant methods provided in any embodiment of the present application.

Figure 11:
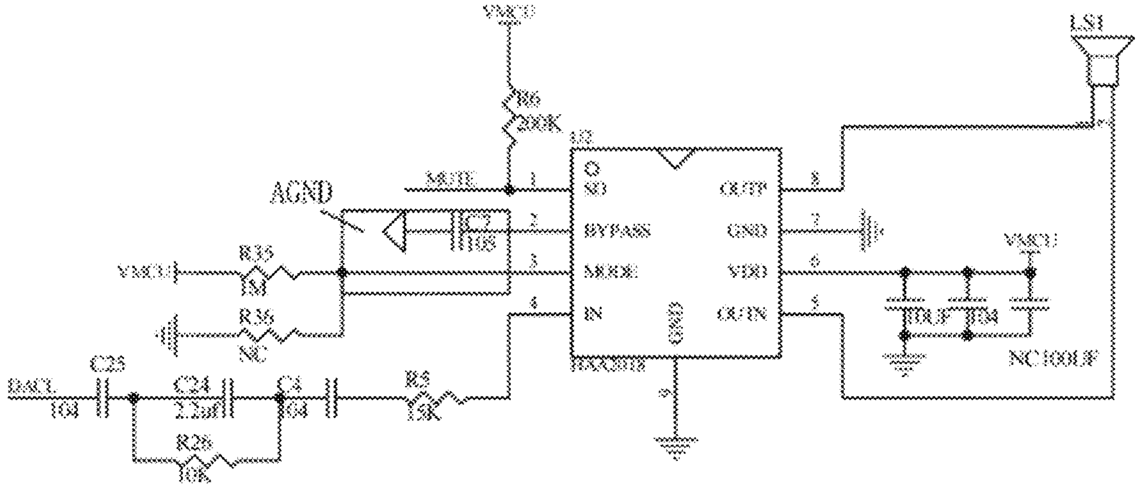
FIG. 11 is a schematic diagram of an audio amplifier and speaker driver circuit of the projection lamp according to an embodiment of the present disclosure.
Figure 12:
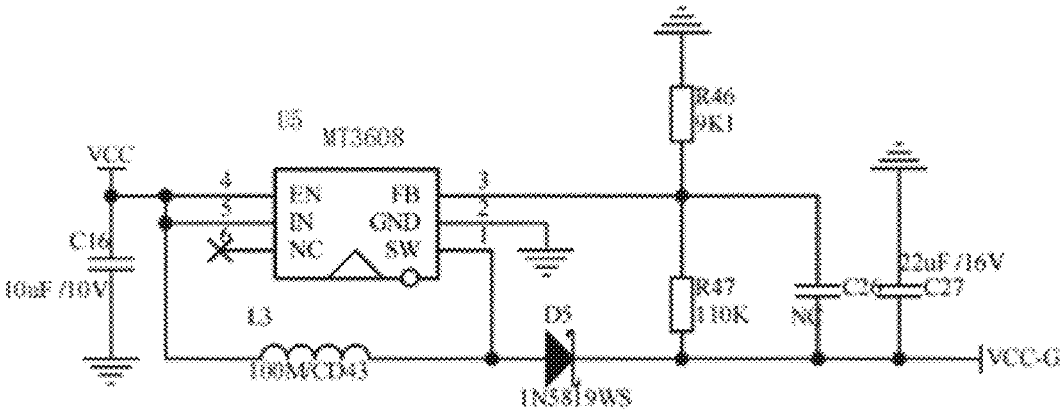
FIG. 12 is a schematic diagram of the laser driving circuit of the projection lamp according to an embodiment of the present disclosure.
Figure 13:
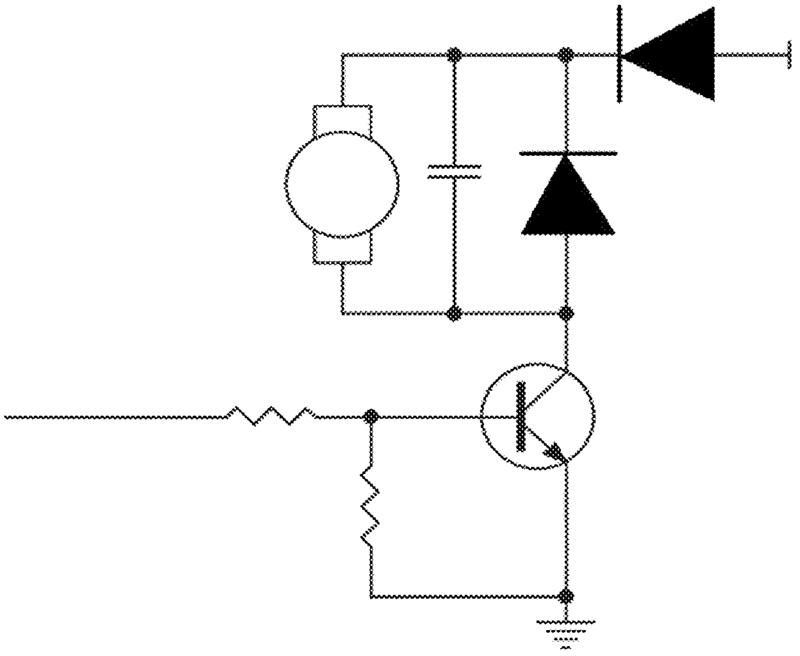
FIG. 13 is a schematic diagram of a motor drive circuit of the projection lamp according to an embodiment of the present disclosure.
Figure 14:
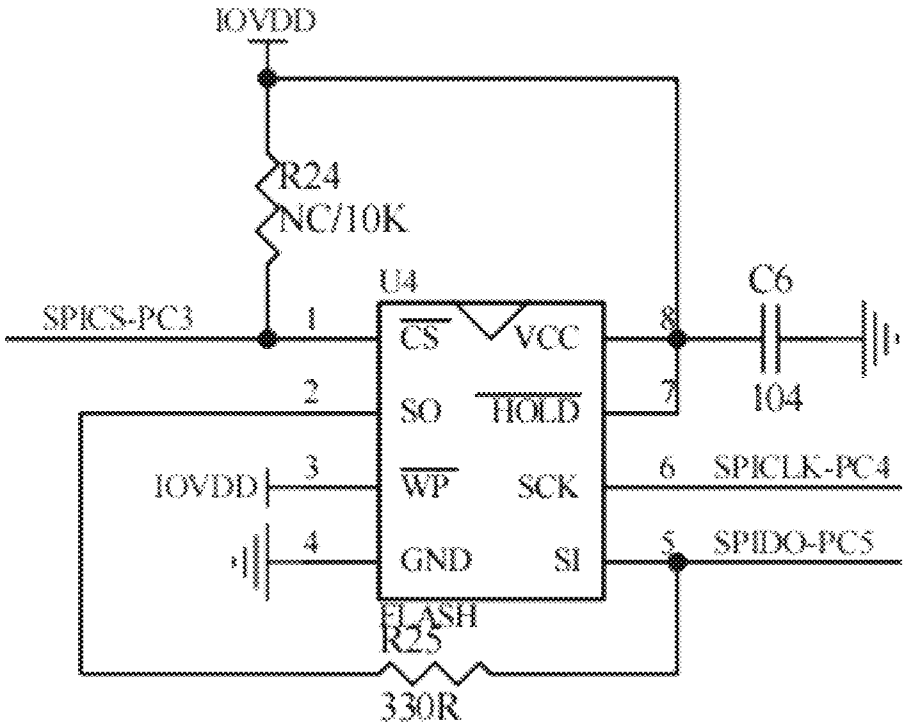
FIG. 14 is a schematic circuit diagram of the system parameters and data storage sub circuit of the projection lamp according to an embodiment of the present disclosure.
Figure 15:
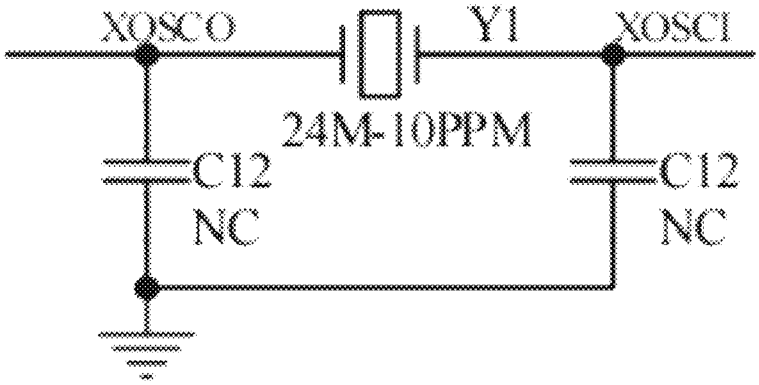
FIG. 15 is a schematic circuit diagram of an external clock/crystal oscillator circuit of the main control Bluetooth SoC (System on Chip) of the projection lamp according to an embodiment of the present disclosure.
Figure 16:
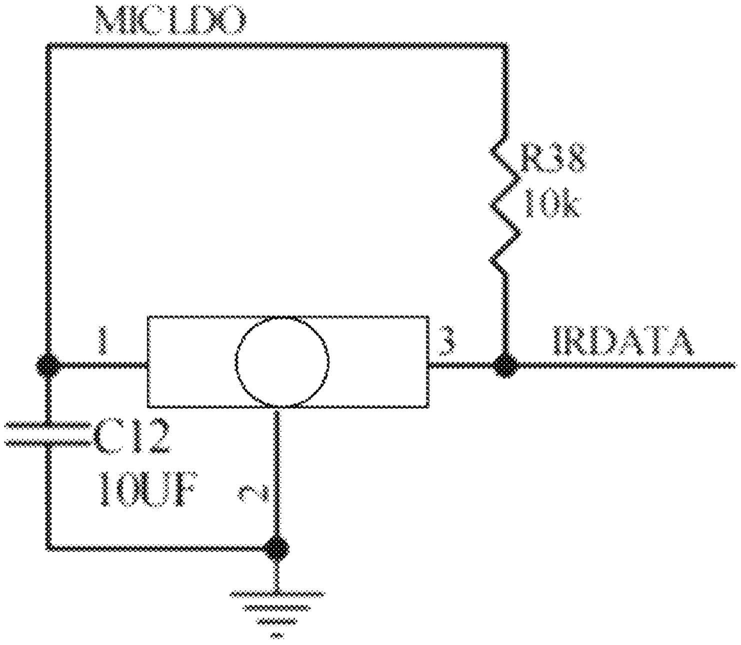
FIG. 16 is a schematic circuit diagram of an infrared receiving and signal shaping sub circuit of the projection lamp according to an embodiment of the present disclosure.
Figure 17:
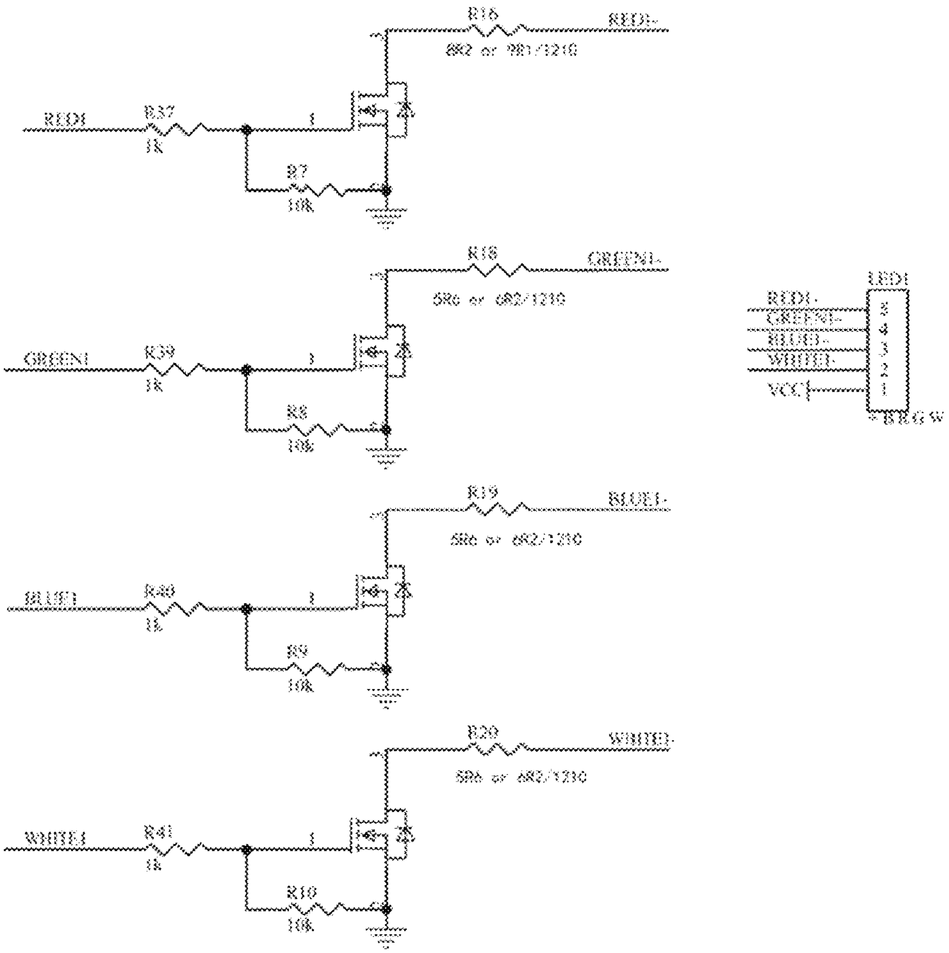
FIG. 17 is a schematic circuit diagram of the first LED lamp driving sub circuit corresponding to RGBW projection of the projection lamp according to an embodiment of the present disclosure.
Figure 18:
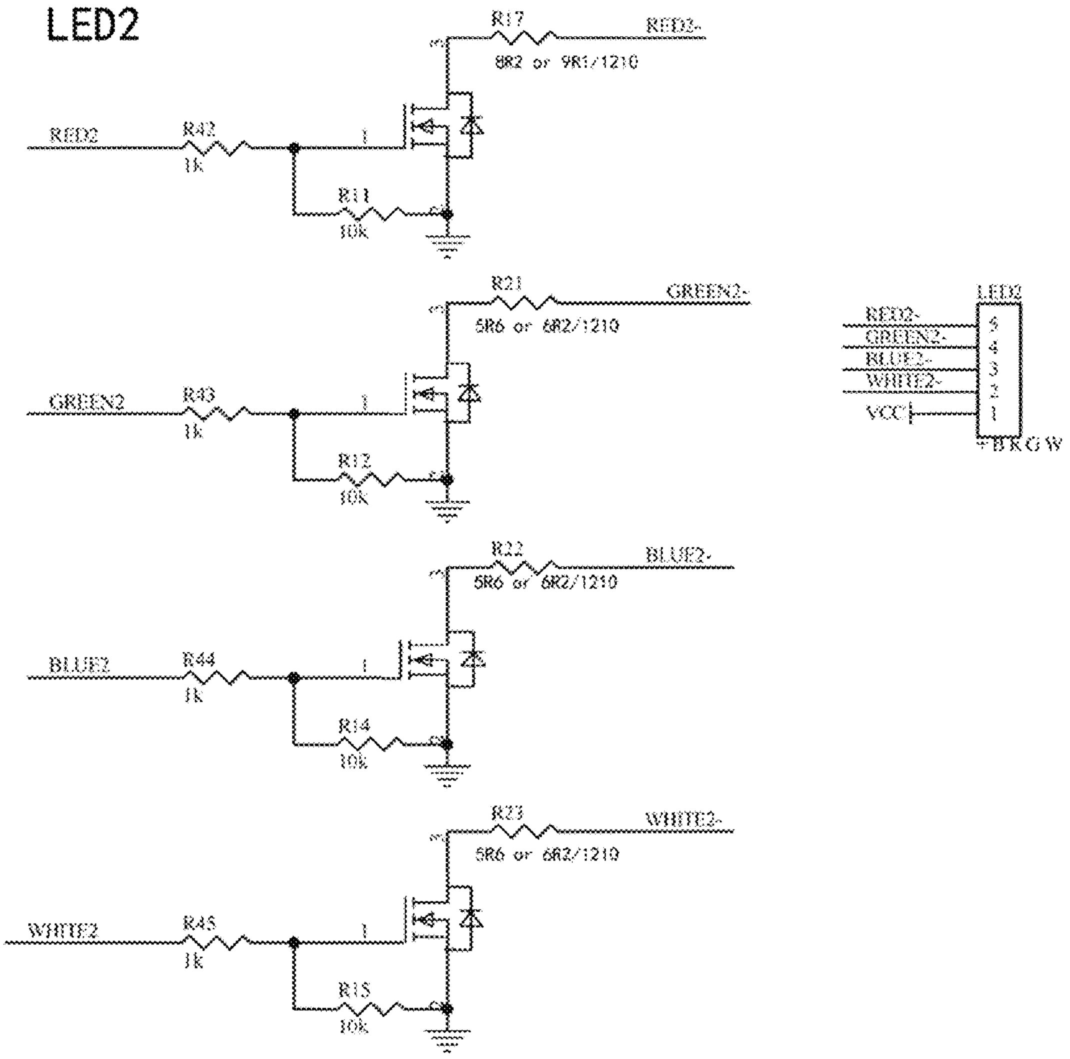
FIG. 18 is a schematic circuit diagram of the second LED lamp driving sub circuit corresponding to RGBW projection of the projection lamp according to an embodiment of the present disclosure.
Figure 19:
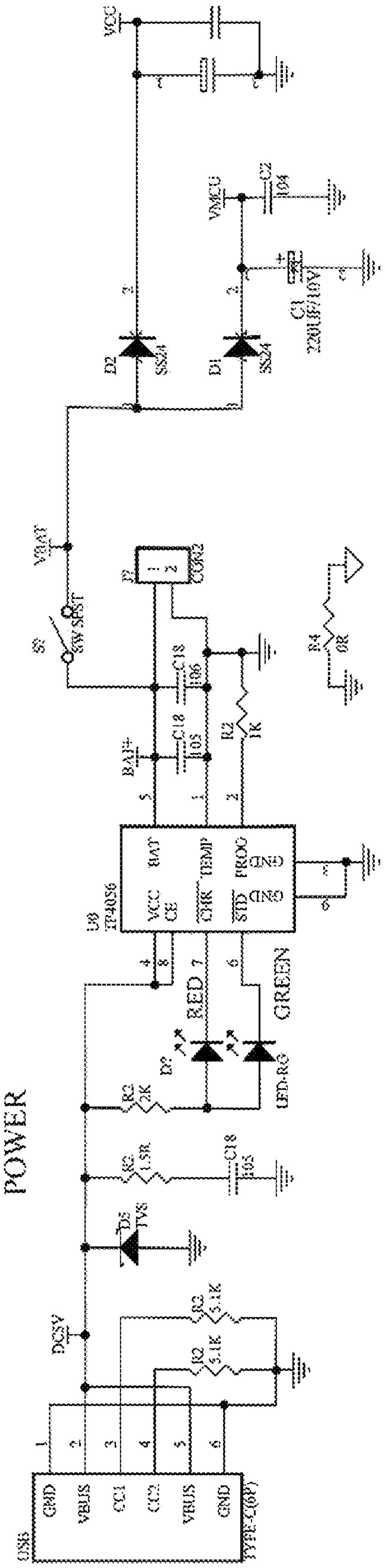
FIG. 19 is a schematic circuit diagram of a power management, lithium battery charging and discharging, and system power supply electronic circuit of the projection lamp according to an embodiment of the present disclosure.
Figure 20:
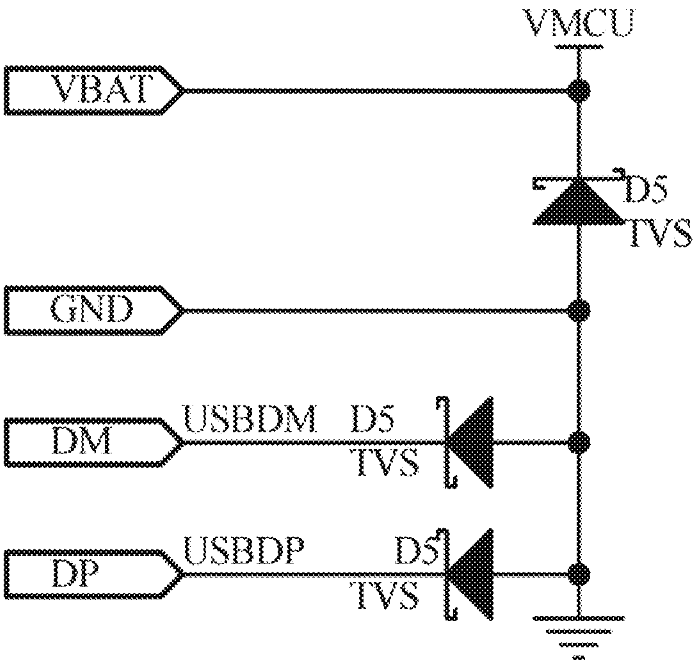
FIG. 20 is a schematic circuit diagram relating to a USB interface protection and debugging sub circuit of the projection lamp according to an embodiment of the present disclosure.
Figure 21:
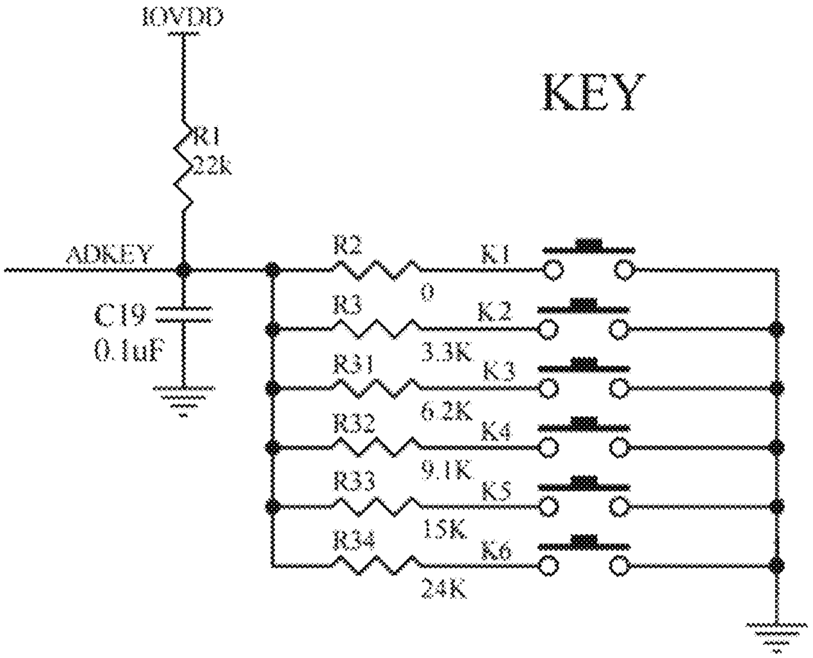
FIG. 21 is a schematic circuit diagram relating to a key input and human-machine interaction control sub circuit of the projection lamp according to an embodiment of the present

FIG. 11 is a schematic diagram of the audio amplifier and speaker driving circuit corresponding to the projection lamp. FIG. 12 is a schematic diagram of the laser driving circuit corresponding to the projection lamp. FIG. 13 is a schematic diagram of the motor driving circuit corresponding to the projection lamp, and the FIGS. 12 and 13 are in parallel relationship in laser driving and can both achieve corresponding functions. FIG. 14 is a schematic diagram of the system parameters and data storage sub circuit corresponding to the projection lamp, used for SPIFlash storage sub circuit (also known as external non-volatile storage circuit). FIG. 15 is a schematic diagram of the external clock/crystal oscillator sub circuit of the main control Bluetooth SoC (System on Chip) corresponding to the projection lamp. FIG. 16 is a schematic diagram of the infrared receiving and signal shaping sub circuit corresponding to the projection lamp. FIG. 17 is a schematic diagram of the first LED lamp driving sub circuit corresponding to the RGBW projection of the projection lamp, used to achieve multi-channel LED low-end switch driving through PWM. FIG. 18 is a schematic diagram of the second LED lamp driving sub circuit corresponding to the RGBW projection of the projection lamp, which is symmetrical to FIG. 17 and has the same function and effect. FIG. 19 is a schematic diagram of the power management, lithium battery charging and discharging, and system power supply electronic circuit corresponding to the projection lamp, used for power management and supply circuit (USB power supply/lithium battery charging/system power distribution), which is the "energy center" of the entire projection karaoke device. FIG. 20 is a schematic diagram of the USB interface protection and debugging sub circuit corresponding to the projection lamp, which corresponds to the USB interface static/surge protection and testing sub circuit (USBESD/TVS protection circuit). FIG. 21 is a schematic diagram of the key input and human-machine interaction control sub circuit corresponding to the projection lamp, such as used for key/infrared/peripheral control circuits.

In some embodiments, FIGS. 22 to 24 are circuit diagrams corresponding to the microphone 9 connected to the projection lamp provided, as shown in FIG. 22, which is a schematic diagram of the main control Bluetooth audio SoC core circuit corresponding to the microphone 9 provided, specifically, it includes the core circuit of the main control Bluetooth audio SoC (TW6063M minimum system+audio front-end+RF+clock+interface protection). FIG. 23 is a schematic diagram of the power input and lithium battery charging management circuit corresponding to the provided microphone 9, specifically used for Type-C power input+single lithium battery charging management circuit. FIG. 24 is a schematic diagram of the button input and ADC (Analog-to-Digital Converter) recognition circuit corresponding to microphone 9 provided, specifically used for ADC resistor ladder button circuit/single ADC multi key recognition circuit.

An exemplary working logic corresponding to the circuit includes:

Step 1: Power on and supply: USB insertion→TP4056 operation→Charge the lithium battery while supplying power to the system→Generate VCC/VMCU/IOVDD.

Step 2: Main control startup, 24 MHz crystal oscillator startup, TW6063M power on reset, Bluetooth protocol stack and audio module initialization.

Step 3: Audio input, selected one from three or mix from the following: microphone MIC picking up→ADC; AUX wired audio→ADC; or microphone 9 receiving digital audio through Bluetooth.

Step 4: Internal processing of the main control→Volume control→Mixing (accompaniment+human voice)→K-song sound effects (echo/reverb)→Mode switching (key ADKEY).

Step 5: Audio output, audio data DAC, send the sound to the amplifier and speaker for playback.

This circuit diagram is based on the TW6063M Bluetooth Audio SoC, which works together through sub circuits such as power management, microphone 9 and AUX input, Bluetooth audio reception, button control, and amplifier output to achieve microphone amplification, microphone 9 playback, and multi-mode audio playback functions.

It should be understood that the terms used in this application are only for the purpose of describing specific embodiments and are not intended to limit this application. It should be understood that when a component or layer is referred to as "on . . . ", "adjacent to . . . ", "connected to", or "coupled to" other components or layers, it may be directly on, adjacent to, connected to, or coupled to other components or layers, or there may be intervening components or layers. On the contrary, when a component is referred to as "directly on . . . ", "directly adjacent to . . . ", "directly connected to", or "directly coupled to" other components or layers, there are no intervening components or layers. It should be understood that although the terms first, second, third, etc. may be used to describe various elements, components, regions, layers, and/or portions, these elements, components, regions, layers, and/or portions should not be limited by these terms. These terms are only used to distinguish one element, component, region, layer or part from another element, component, region, layer or part. Therefore, without departing from the teachings of this application, the first element, component, region, layer, or portion discussed below may be referred to as a second element, component, region, layer, or portion.

Spatial relationship terms such as "below", "below", "below", "below", "above", "above", etc. can be used here for ease of description to describe the relationship between an element or feature shown in the figure and other elements or features. It should be understood that in addition to the orientation shown in the figure, the spatial relationship terminology also includes the different orientations of the devices used and operated. For example, if the device in the figure is flipped, then the element or feature described as "below" or "below" or "below" will be oriented "above" other elements or features. Therefore, the exemplary terms' below 'and' below 'may include both upper and lower orientations. The device can be oriented externally (rotated 90 degrees or other orientations) and the spatial descriptors used here are explained accordingly.

The terminology used here is only for the purpose of describing specific embodiments and does not serve as a limitation of the present application. When used here, the singular forms of "one", "one", and "said/said" are also intended to include the plural form, unless the context clearly indicates otherwise. It should also be understood that the terms' composition 'and/or' including ', when used in this specification, determine the presence of the described features, integers, steps, operations, elements, and/or components, but do not exclude the presence or addition of one or more other features, integers, steps, operations, elements, components, and/or groups. When used here, the term "and/or" includes any and all combinations of the listed items related to it.

It should also be understood that the term "and/or" used in this application specification and the accompanying claims refers to any combination of one or more of the listed items and all possible combinations, and includes these combinations.

The above descriptions are only preferred embodiments of the present disclosure, and are not intended to limit the patent scope of the present disclosure. Any equivalent structural transformation made by using the content of the specification and the drawings of the present disclosure under the invention idea of the present disclosure, directly or indirectly applied to other related technical fields, shall all be included in the scope of patent protection of the present disclosure.

What is claimed is:

1. A projection lamp, comprising:

a projection mechanism comprising a light source, and an optical module located on a light-emitting path of the light source and configured to transform light emitted by the light source to form one or more projection images with predetermined patterns, and/or text, and/or dynamic effects;

a wireless communication module, configured to wirelessly communicate with an external electronic device and at least one microphone, for receiving a first audio signal emitted by the external electronic device and a second audio signal emitted by the at least one microphone;

a speaker module; and a control module electrically connected to the projection mechanism, the wireless communication module and the speaker module, and configured to control a projection of the projection mechanism, and output the first and second audio signals via the speaker module.

2. The projection lamp according to claim 1, wherein the first audio signal and the second audio signal have different wireless transmission frequencies, allowing the wireless communication module to simultaneously receive the first audio signal and the second audio signal; and the wireless communication module is a Bluetooth wireless communication module; the first audio signal and the second audio signal both use 2.4G private wireless communication protocol and have different frequency bands.

3. The projection lamp according to claim 2, wherein the at least one microphone comprises two microphones, the wireless communication module simultaneously wirelessly connecting the two microphones to receive the second audio signal emitted by each of the two microphones.

4. The projection lamp according to claim 2, wherein the wireless communication module comprises a dual-mode wireless communication chip and at least one antenna electrically connected to the dual-mode wireless communication chip;

wherein the at least one antenna is used to receive the first audio signal emitted by the external electronic device and the second audio signal emitted by the at least one microphone;

the dual-mode wireless communication chip is used to demodulate the first audio signal and the second audio signal to the control module.

5. The projection lamp according to claim 2, wherein the wireless communication module comprises a first wireless communication chip, a second wireless communication chip, and at least one antenna electrically connected to the first wireless communication chip and the second wireless communication chip;

wherein the at least one antenna is configured to receive the first audio signal emitted by the external electronic device and the second audio signal emitted by the microphone; the first wireless communication chip is configured to demodulate the first audio signal to the control module; and the second wireless communication chip is configured to demodulate the second audio signal to the control module.

6. The projection lamp according to claim 1, wherein the control module is further configured to control operation of the light source and/or the optical module based on the first audio signal and/or the second audio signal, so that the one or more projection images in conjunction with the first audio signal and/or the second audio signal form a rhythm; and wherein the one or more projection images comprise at least a first projection image; the optical module comprises a first motor, a grating element connected to the motor, and at least one projection lens; the light source comprises a first light source, and light emitted by the first light source is capable of generating the first projection image through the grating element driven by the motor and the at least one projection lens; the control module controls light emission of the first light source and/or rotation of the optical module based on the first audio signal and/or the second audio signal.

7. The projection lamp according to claim 6, wherein the one or more projection images further comprise a second projection image; the light source further comprises a second light source and a second grating element; light emitted by the second light source is capable of generating the second projection image through the second grating element;

a projection area of the first projection image and a projection area of the second projection image at least partially overlap; and the control module controls light emission of the second light source based on the first audio signal and/or the second audio signal.

8. The projection lamp according to claim 7, wherein the one or more projection images further comprise a third projection image; the light source further comprises a third light source and a movable third grating element; light emitted by the third light source is capable of generating a third projection image through the moving third grating element;

a projection area of the first projection image and a projection area of the third projection image at least partially overlap; and the control module controls light emission of the third light source and/or the movement of the third grating element based on the first audio signal and/or the second audio signal.

9. The projection lamp according to claim 1, wherein the control module detects whether the first audio signal emitted by the external electronic device is an accompaniment signal, and whether the second audio signal emitted by at least one microphone is a human voice signal through the wireless communication module;

if the control module determines that the first audio signal is an accompaniment signal and the second audio signal is a human voice signal, the control module controls the speaker module to mix and play the accompaniment signal and the human voice signal, while extracting the audio feature parameters of the accompaniment signal; and the control module controls a brightness of the light source of the projection mechanism, a rotation speed of the grating of the optical module, and a switching frequency of the projection image based on the extracted audio feature parameters, so that the dynamic effects of the projection image are synchronized with a rhythm and a tone of the accompaniment signal.

10. The projection lamp according to claim 9, wherein if the control module detects that an interruption of the human voice signal exceeds a preset duration, the control module reduces the brightness of the light source and controls the optical module to project a static pattern; and if the control module detects the human voice signal again, the brightness of the light source and the dynamic effects are restored.

11. The projection lamp according to claim 1, wherein the at least one microphone comprises a plurality of microphones, the control module identifies the second audio signal corresponding to each microphone connected simultaneously through the wireless communication module, and assigns a unique signal identifier to each microphone.

12. The projection lamp according to claim 11, wherein the control module collects real-time volume amplitude data of each second audio signal and calculates an average volume amplitude of all second audio signals;

the control module controls an attenuation processing of the second audio signal if a volume amplitude is higher than a preset threshold of the average value, and controls a gain processing of the second audio signal if a volume amplitude is lower than the preset threshold of the average value, so that the volume amplitudes of all second audio signals are balanced to tend to be consistent; and the control module mixes all the balanced second audio signals with the first audio signal to output the first and second audio signals via the speaker module; and controls the projection mechanism to project identification patterns corresponding to the number of microphones to distinguish sound states of the plurality of microphones.

13. The projection lamp according to claim 1, wherein the control module controls the wireless communication module to receive the second audio signal emitted by the at least one microphone, and transmits the second audio signal to a preset speech recognition module;

the control module performs speech analysis on the second audio signal through a speech recognition module to extract a key control information from a voice command; the key control information includes at least one of projection pattern switching, light source switch, brightness adjustment, volume adjustment, and audio signal switching;

the control module generates corresponding control instructions based on the extracted key control information to transmit to the projection mechanism, wireless communication module, or speaker module; and wherein the control module controls the speaker module to play the operation confirmation voice and controls the projection mechanism to project the operation confirmation pattern; if no new voice command is detected within a preset time, current control state is maintained.

14. The projection lamp according to claim 1, wherein the optical module comprises a plurality of light sources and grating elements, the control module controls the light sources to start and drives the grating elements to rotate respectively to allow each grating element generate a preset projection image, which includes at least two of starry sky pattern, water ripple pattern, and hexagonal dynamic pattern.

15. The projection lamp according to claim 14, wherein the control module receives the first audio signal and/or the second audio signal through the wireless communication module, and extracts frequency characteristics of the audio signal;

the control module controls a rotation speed of different grating elements and an emission intensity of the corresponding light source based on the frequency characteristics of the audio signal, so that projection areas of different preset projection images partially overlap, forming an overlay projection effect.

16. The projection lamp according to claim 15, wherein the control module monitors the frequency characteristics change; when a frequency increases, accelerate a rotation speed of the grating element and increase a brightness of the light source; when the frequency decreases, slow down a rotation speed of the grating element and reduce the brightness of the light source, achieving a dynamic synergy between the overlay projection effect and the audio signal.

17. The projection lamp according to claim 1, wherein the control module real-time detects a Bluetooth connection status between the wireless communication module and the external electronic device, and the at least one microphone, and collects connection signal strength data;

if the control module detects that the Bluetooth connection signal strength of the external electronic device, or the at least one microphone is lower than the preset threshold, control the wireless communication module to automatically adjust a communication frequency band and send a connection stability request to the corresponding device;

if the connection signal strength still does not reach a preset threshold after adjusting the communication frequency band, the control module controls the speaker module to play an unstable connection prompt voice, and controls the projection mechanism to project abnormal connection patterns, while attempting to re-establish the Bluetooth connection;

when the Bluetooth connection of an external electronic device is detected to be disconnected, the Bluetooth connection with the microphone is automatically retained, and the projection mechanism is controlled to switch to an exclusive projection mode corresponding to the microphone; and when a new external electronic device is detected requesting a connection, the microphone with the lowest signal strength is first disconnected and a connection is established with the new external electronic device.

18. The projection lamp according to claim 1, wherein the control module receives the first audio signal and the second audio signal through the wireless communication module, while collecting environmental noise signals;

the control module extracts feature from the collected environmental noise signals and generates a noise feature model; and the control module performs noise reduction processing on the first audio signal and the second audio signal based on the noise feature model, filtering out signals that match an environmental noise;

the control module performs sound quality optimization processing on the first and second audio signals after noise reduction processing, improving a clarity of a human voice signal and a stereoscopic effect of an accompaniment signal, the sound quality optimization processing includes enhancing a predetermined frequency component of the human voice signal, and balancing amplitude values of frequency components of the accompaniment signal; and the control module mixes the optimized first audio signal and second audio signal, and output through the speaker module, and controls the projection mechanism to switch a corresponding sound quality optimization identification projection according to a type of audio signal.

* * * * *